US009630676B2

(12) United States Patent
Yelvington

(10) Patent No.: US 9,630,676 B2
(45) Date of Patent: Apr. 25, 2017

(54) CONVERSION KITS FOR CONVERTING A TWO WHEELED MOTORCYCLE TO A THREE WHEELED TRIKE CONFIGURATION AND METHODS THEREFOR

(71) Applicant: Yelvington Trikes, LLC, Seminole, FL (US)

(72) Inventor: Richard D. Yelvington, Largo, FL (US)

( * ) Notice: Subject to any disclaimer, the term of this patent is extended or adjusted under 35 U.S.C. 154(b) by 0 days.

(21) Appl. No.: 14/818,509

(22) Filed: Aug. 5, 2015

(65) Prior Publication Data
US 2015/0353159 A1 Dec. 10, 2015

Related U.S. Application Data

(63) Continuation-in-part of application No. 14/818,509, filed on Dec. 20, 2013, now Pat. No. 9,132,879.

(60) Provisional application No. 61/848,295, filed on Dec. 31, 2012.

(51) Int. Cl.
*B62K 13/04* (2006.01)
*B62K 11/02* (2006.01)
*F16H 48/06* (2006.01)
*B62M 9/02* (2006.01)
*B60K 17/16* (2006.01)
*B62K 11/00* (2006.01)

(52) U.S. Cl.
CPC ............ *B62K 11/02* (2013.01); *B60K 17/165* (2013.01); *B62K 11/00* (2013.01); *B62K 13/04* (2013.01); *B62M 9/02* (2013.01); *F16H 48/06* (2013.01); *Y10T 29/49622* (2015.01); *Y10T 29/49718* (2015.01)

(58) Field of Classification Search
CPC ................................ B62K 13/04; B62K 11/02
USPC ........................................................ 180/209
See application file for complete search history.

(56) References Cited

U.S. PATENT DOCUMENTS

| 2,376,419 | A | | 5/1945 | Cole |
| 4,449,602 | A | * | 5/1984 | Dittmann, Jr. ........... B62K 5/06 180/215 |
| 4,561,518 | A | | 12/1985 | Grinde |
| 4,860,850 | A | | 8/1989 | Takahashi |
| 4,876,918 | A | | 10/1989 | Hudson |
| 4,905,787 | A | | 3/1990 | Morin |
| 6,883,629 | B2 | | 4/2005 | Hanagan |
| 7,228,930 | B1 | | 6/2007 | Vey |
| 7,581,610 | B2 | | 9/2009 | Ward |
| 7,610,979 | B1 | | 11/2009 | Dykowski |
| 7,762,368 | B2 | | 7/2010 | Matthies |
| 7,918,300 | B2 | | 4/2011 | Barns |
| 7,984,782 | B2 | | 7/2011 | Platt |

(Continued)

FOREIGN PATENT DOCUMENTS

WO WO 2006125320 A1 * 11/2006 ............. B62K 13/04

*Primary Examiner* — James A English
(74) *Attorney, Agent, or Firm* — Laurence P. Colton; Smith Tempel Blaha LLC

(57) ABSTRACT

A conversion kit for converting a two wheeled motorized vehicle to a three-wheeled motorized vehicles, having a two-wheeled axle and offset drive assembly that is non-coaxial with the original one wheeled axle, having two drive sprockets one of which is rearwardly offset from the other, and is driven by a minimally adapted original drive assembly corresponding to the original one wheeled axle.

15 Claims, 34 Drawing Sheets

(56) References Cited

U.S. PATENT DOCUMENTS

| | | | |
|---|---|---|---|
| 2002/0063011 A1 | 5/2002 | Montague | |
| 2006/0172846 A1 | 8/2006 | Gassmann | |
| 2007/0052199 A1* | 3/2007 | Schulte | B62K 13/04 280/259 |
| 2008/0135320 A1 | 6/2008 | Matthies | |
| 2010/0013180 A1 | 1/2010 | Allman | |
| 2012/0056400 A1 | 3/2012 | St. Clair | |
| 2012/0193161 A1* | 8/2012 | Chang | B62K 5/027 180/215 |
| 2015/0021877 A1* | 1/2015 | Kim | B62K 13/04 280/282 |
| 2016/0023709 A1* | 1/2016 | Kokes | B62K 13/04 280/269 |

\* cited by examiner

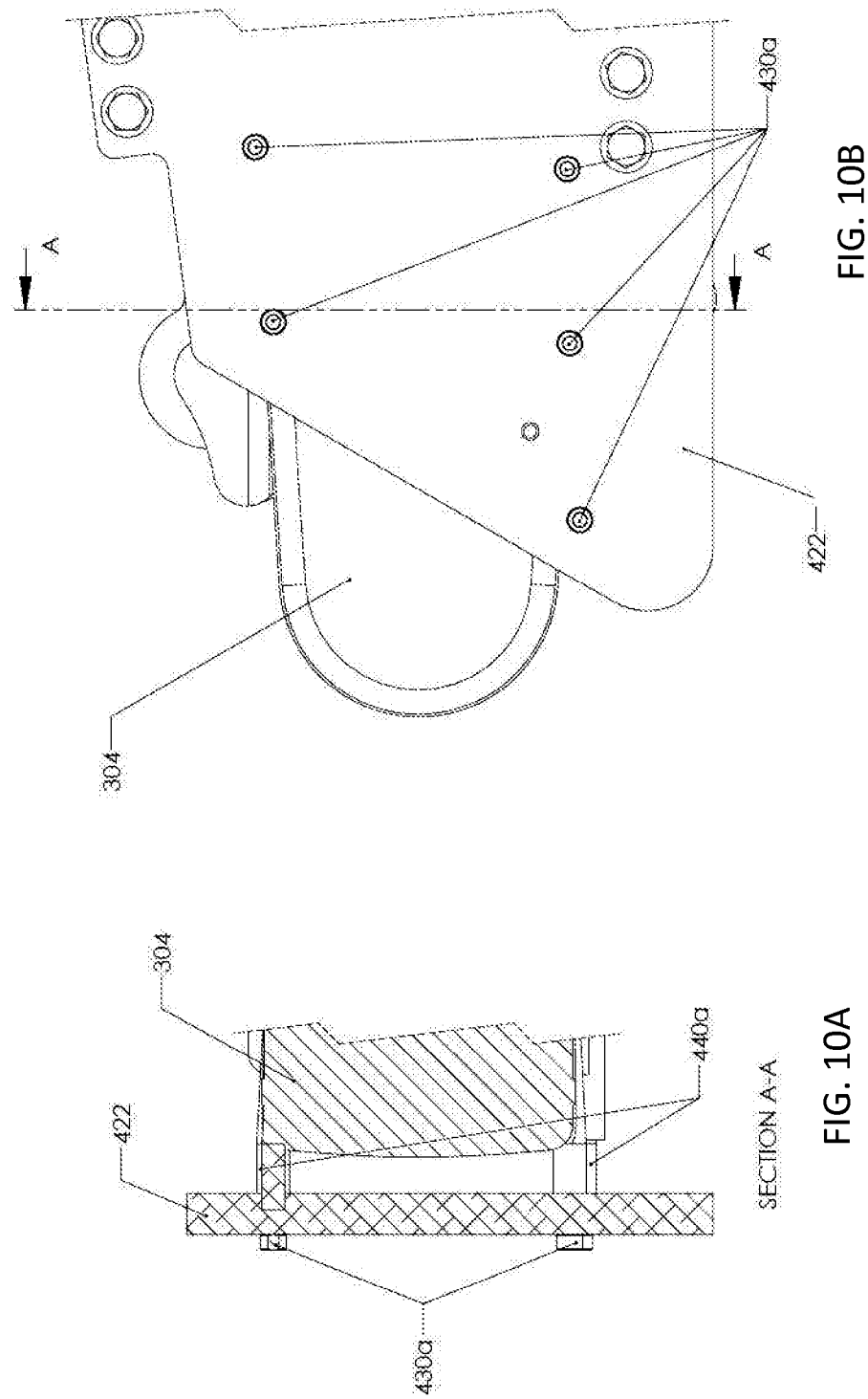

CONVERSION KITS FOR CONVERTING A TWO WHEELED MOTORCYCLE TO A THREE WHEELED TRIKE CONFIGURATION AND METHODS THEREFOR

STATEMENT OF RELATED APPLICATIONS

This patent application is a continuation-in-part of and claims the benefit of U.S. patent application Ser. No. 14/135,974 having a filing date of 20 Dec. 2013, which claims the benefit of U.S. Provisional Patent Application No. 61/848,295 having a filing date of 31 Dec. 2012.

BACKGROUND OF THE INVENTION

Technical Field

The present invention generally is in the field of conversion kits for converting two wheeled motorized vehicles to three-wheeled motorized vehicles. The present invention also is in the field of conversion kits having a two-wheeled axle and offset drive assembly that is non-coaxial with the original one wheeled axle and is driven by a minimally adapted original drive assembly corresponding to the original one wheeled axle. The present invention additionally is in the field of conversion kits that are substantially within the unmodified footprint defined by the space around the original one wheeled axle. The invention further is in the field of conversion kits having a non-straddle, axle-supported differential and/or a braking assembly at least partially attached to a differential housing.

Prior Art

Like bicycles, two-wheel motorcycles rely on the ability of the rider to maintain balance of the vehicle when moving or at a rest. However, a three wheel motorcycle or motortricycle, often called a trike, having a "delta configuration" (i.e. one front wheel and two rear wheels) gives an ordinary motorcycle the inherent ability to remain upright when moving and at rest. This is possible due to the stance created from changing the dimensional stability of the motorcycle from vertical to horizontal with the replacement of the one rear wheel with two rear wheels that are spread far enough apart to create a stable platform.

Many efforts have been made to achieve this dimensional stability by the use of add on, outboard wheels. This creates a four wheel vehicle (one in front and three rear wheels) that retains the original rear wheel to provide the drive power. This is similar to the training wheels used on a child's first bicycle. This configuration gives riding and at rest stability but carries an often dangerous risk when cornering. With the outboard wheel configuration the outer tire will lift during most turns. When this happens the outboard tires and center drive wheel are usually rotating at different speeds because of their different diameters or distance from the center line of the vehicle. As the turn is completed the outer wheel comes back into contact with the road surface. That outer tire must now "spin up" its rotation to match the other tires. This spinning up causes a drag on that side of the vehicle with a corresponding braking action thus lurching the vehicle towards that side.

To eliminate this, most trike designs have gone to the delta configuration where the two rear wheels are on a solid axle or more commonly two axles joined by a differential unit. Most of these designs require extensive modification to the swing arm and even the motorcycle frame itself due to the weight of the rear assembly with its tires, fenders, and sometimes a fiberglass or metal full body. Many of these conversions use shortened versions of regular automobile rear ends. Their extensive use of all steel automotive components results in excessive weight behind the normal center of gravity of the vehicle. Additionally, these conversions tend to require special skills, special equipment, and often take weeks of shop time to accomplish.

Based upon these design compromises, it becomes apparent that what is needed is a rigid, light weight design that gives greater maneuverability, better mileage, and is readily adaptable to a variety of motorcycle makes and models. It is to these needs and others that the present invention is directed.

BRIEF SUMMARY OF THE INVENTION

Briefly, the present invention is a conversion kit for converting two wheeled motorized vehicles to a three-wheeled motorized vehicles and having an offset drive assembly comprising a first drive sprocket attached to the transfer case cooperating with an second drive sprocket rearwardly offset from the first drive sprocket and attached to or coaxial with the rear axle and/or differential. In some embodiments, the present invention comprises a motorcycle axle conversion kit that powers the differential assembly of a two-wheeled replacement system using the pre-existing drive assembly of an original wheel. In other embodiments, the present invention comprises a method of converting a motorcycle axle for use in a trike such that the pre-existing drive assembly of an original wheel powers the differential assembly of a two-wheel replacement system.

In one illustrative embodiment, a conversion kit comprises a drive assembly adaptor, a differential assembly, and a box frame or the equivalent for containing and supporting the components of the invention. The drive assembly adaptor is configured to mechanically engage with, and to rotate via, the pre-existing drive assembly of an original wheel, and can comprise a first drive sprocket or the equivalent. The differential assembly is configured to rotate via rotation of the drive assembly adaptor, and comprise a second drive sprocket or the equivalent rearwardly offset from the first drive sprocket. The box frame comprises at least two side plates and at least one supporting cross bar connecting the at least two side plates. The box frame is configured to securely engage with the pre-existing drive assembly and to engage with a shock absorber corresponding to the pre-existing drive assembly. The box frame defines an internal space for containing and supporting the components of the invention.

When the conversion kit is assembled and installed on the motorcycle, the box frame is positioned, and pivotally suspended, within a void left by the original wheel. The pre-existing drive assembly, the drive assembly adaptor, and the differential assembly are positioned within the internal space of the box frame. The differential assembly is set back (offset) from the drive assembly adaptor and the pre-existing drive assembly. The conversion kit is supported by the pre-existing drive assembly and the shock absorber.

The drive assembly adaptor may comprise a first drive sprocket defining a first plane of rotation. The first drive sprocket is configured to rotate via the pre-existing drive assembly and as such preferably is attached to and directly cooperates with the existing transfer case of the vehicle. Similarly, the differential assembly may comprise a second drive sprocket defining a second plane of rotation. The second drive sprocket is configured to rotate via rotation of the first drive sprocket, preferably by a linking drive chain, drive belt, or the like. Therefore, when the conversion kit is assembled and installed on the motorcycle, the first drive sprocket can be aligned with the second drive sprocket such that the second plane of rotation is coplanar with the first plane of rotation, yet rearwardly offset.

Furthermore, in certain embodiments, the present invention comprises an improved method of motorcycle to trike conversion using a monocoque style overlay plate on both sides of the rear swing arm and a non-straddle differential design incorporating hollow metal tube axles and high thrust load maximum surface area bearings. These embodiments provide for the replacement of the single rear wheel assembly of a motorcycle, including the drive assembly and brake assembly, with components comprising a two-wheel rear wheel assembly for converting the motorcycle into a trike, or motor-tricycle.

The preferred non-straddle differential design of the present invention allows the differential to be easily moved to any left and right position on the invention by changing the length of the axles and spacers to allow the differential to work on a modular basis for different trike rear designs. The non-straddle design allows the invention to use the axles as support for the differential.

The differential is designed to run on the ends of the axles and acts as its own support. The differential uses two bearings per side. One bearing acts to carry the spider gear and the axle support and the other bearing acts just to support the differential off the axle. The differential is modular and can be used to match any chain or pulley drive with a simple adaptor on one end.

The preferred substitute swing arms generally replace the swing arms of the original motorcycle without additional reconstruction of the motorcycle frame. The swing arms are designed to incorporate the differential assembly and brake assembly between the swing arms in the same or similar space as the original motorcycle swing arms, thereby generally maintaining the original size structure of the original motorcycle, but now with a rear end tricycle set-up.

These features, and other features and advantages of the present invention will become more apparent to those of ordinary skill in the relevant art when the following detailed description of the preferred embodiments is read in conjunction with the appended drawings in which like reference numerals represent like components throughout the several views.

BRIEF DESCRIPTION OF THE DRAWINGS

FIG. 10A is a sectional view along line A-A of FIG. 10B.

FIG. 10B is a partial left side perspective view of the conversion kit of FIG. 6.

DETAILED DESCRIPTION OF THE INVENTION

Figure 1:
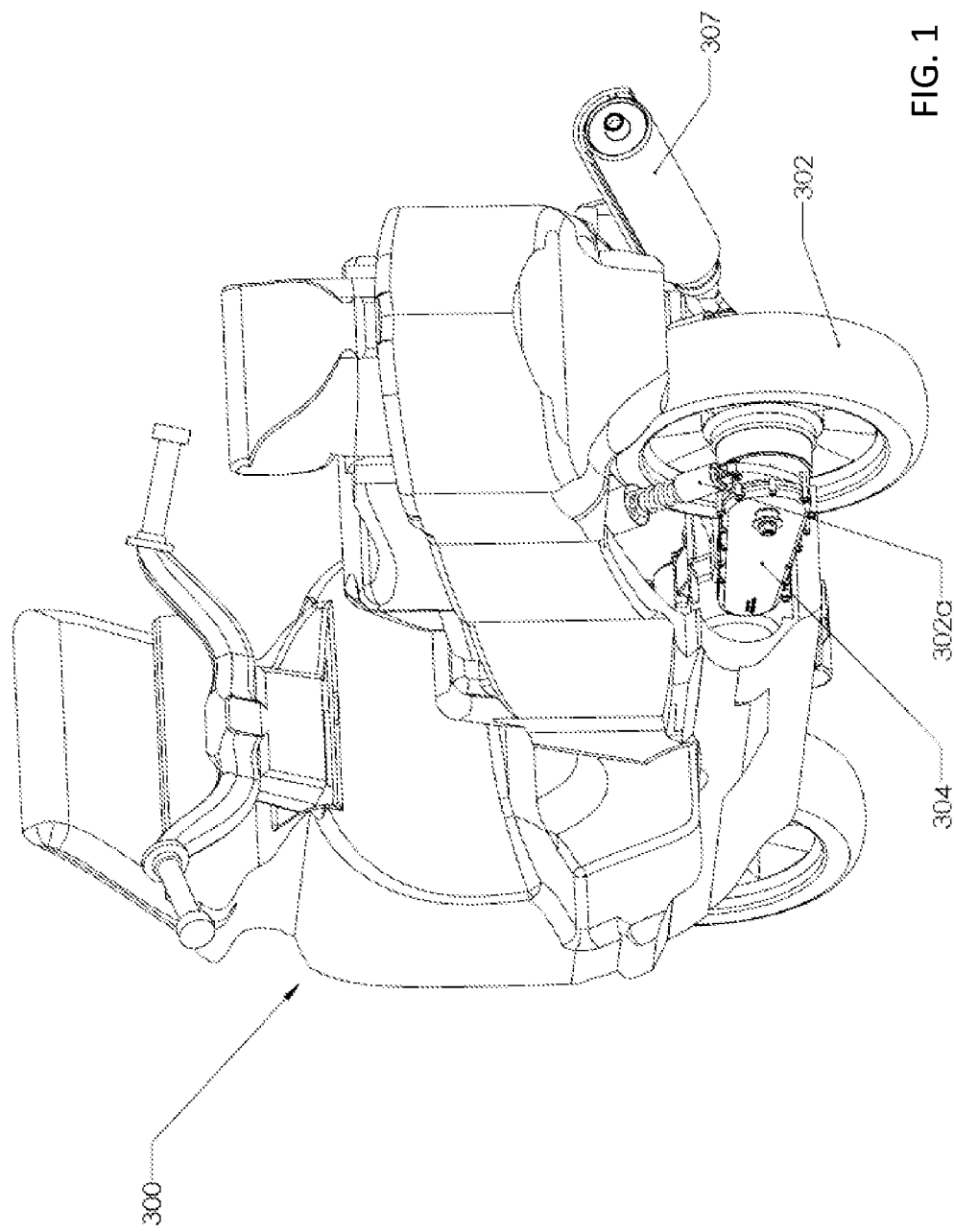
FIG. 1 is a left rear perspective view of one embodiment of a prior art motorcycle suitable for receiving the kit of the present invention.
Figure 2:
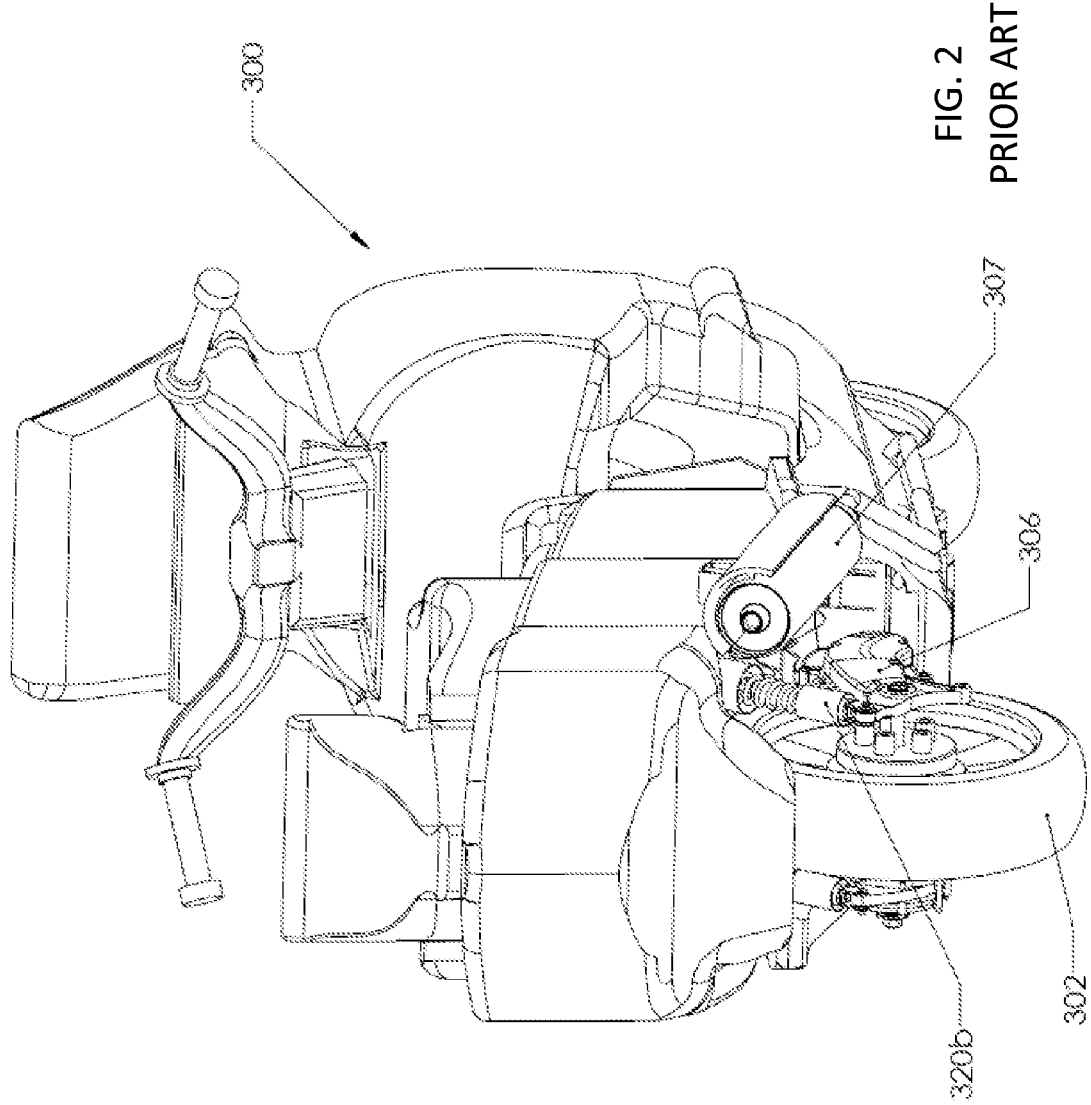
FIG. 2 is a right rear perspective view of the motorcycle of FIG. 1.

The present invention offers significant improvement over existing trike "add on" designs. The present invention may consist of a non-straddle differential enclosed in a bolt-on box frame structure that uses a monocoque style form of braced plates. The present invention also may consist of a straddle differential enclosed in a similar box frame structure. Regardless of the type of differential, the box frame structure is bolted on top or to the side of the transfer case and/or the rear swing arm of the receiving motorcycle. This allows for non-professional installation because it does not require frame modifications to the bike as is necessary on other previous examples of the art.

A key component of one embodiment of the present invention is the clamping method of using a flat plate or round clamps against the swing arm, or the transfer case, with a corresponding drilled plate on the bottom or side of the transfer case, or the swing arm. This allows a nearly universal non-straddle differential design (described in greater detail herein) to be used on multiple configurations. All that is necessary to use the plate on different makes and models of motorcycles is to change the bolt pattern to match up with the specific swing arm or transfer case in question.

A key component of another embodiment of the present invention is the box frame structure being supported by the rear portion of the motorcycle and the box frame structure surrounding the original rear output drive of the transmission. The box frame uses complementary attachment means to the attachment means originally present on the swing arm and transfer case. The box frame, therefore, surrounds the original moving parts, leverages the original space defined by the rear portion, and integrates into the original chassis or framework, of the motorcycle without substantially modification to the rear portion of the motorcycle. This also allows any differential design to be used on multiple configurations.

Furthermore, prior art defines the differential as a straddle design with bearing races protruding from each end that ride on the bearing set into the axle housing ends or a set of pillow blocks bolted to a hard plate or the frame. Either one makes for a longer, heavier and more expensive design than the present invention.

One embodiment of the present invention overcomes these problems by using hollow steel or aluminum tubing for axles which is roughly twice the surface area of current prior art designs. All other designs use solid axles of 0.75" to 1" diameters. This limits the bearing size and loading capacity of the axles and bearings as well as increases rolling friction. By using hollow tubing larger than 1" diameter, weight is saved and depending upon where the splined output is welded, the wheel base of the trike can be configured to exactly match the calculated profile for optimum handling without resorting to extensive additional machining and difficult to produce solid axle lengths. This is an improvement over all other existing designs.

This also offers a significant improvement over prior art as it allows for a differential to be built that can eliminate the need for outer bearing races. The differential now can run directly on the axles themselves using the axles for precise alignment and load support. The bearings now are able to be put at the extreme end of the differential case, which puts the engine output load across the tubing support bearing and the outer differential bearing. These loads are possible only due to the large surface area and use of thrust load bearings and hollow tubing.

By using this configuration, the differential can be 3 to 4 inches shorter than prior art trike differentials. This allows the entire assembly to be placed between the opening left when the stock rear tire of the motorcycle is removed. Currently available models usually have to replace the entire swing arm with a new assembly made wide enough to accommodate the longer standard straddle differential assembly.

The shorter axle loaded differential of the improved design of the present invention also allows for a brake disk to be built into the present invention design and to fit in the space left from removing the rear tire. This can be accomplished by either mounting the brake disk on the end of the differential itself, or if space is limited, a metal ring can be welded to the differential and the brake disk is then bolted to the metal ring. This eliminates the need for individual brakes on each wheel, thus saving on weight and costs.

Referring now to FIGS. 1-5, these are perspective rear views of the rear of one embodiment of a motorcycle suitable for receiving the present invention. More specifically, a motorcycle 300 has a rear wheel 302 engaged, via an original axle 308, with a transfer case 304 and a swing arm 306 (best seen in FIG. 2). The transfer case 304 and the swing arm 306 are components in the original rear drive assembly of the motorcycle 300.

Figure 3:
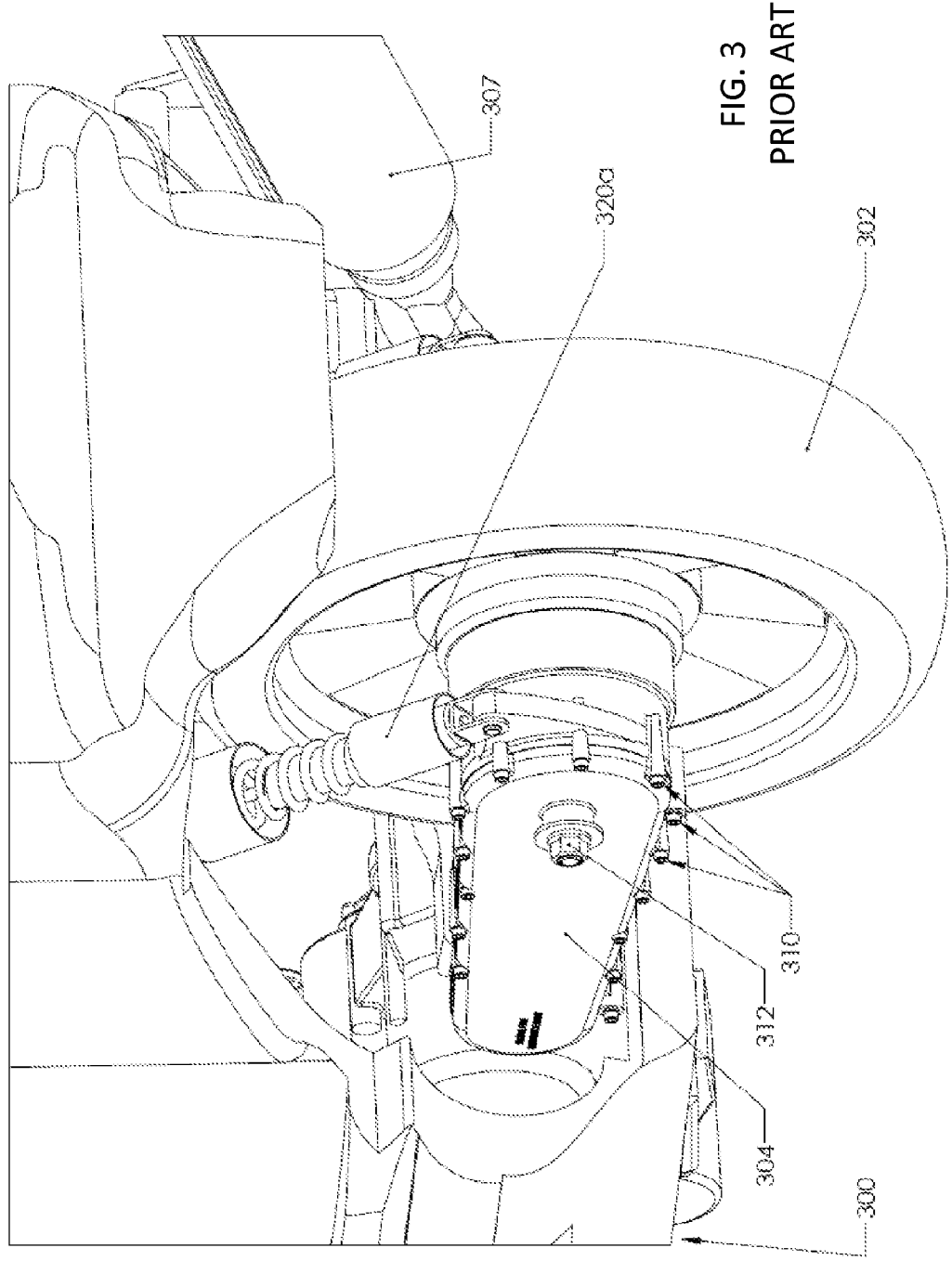
FIG. 3 is an enlarged left rear perspective view of the motorcycle of FIG. 1.
Figure 4:
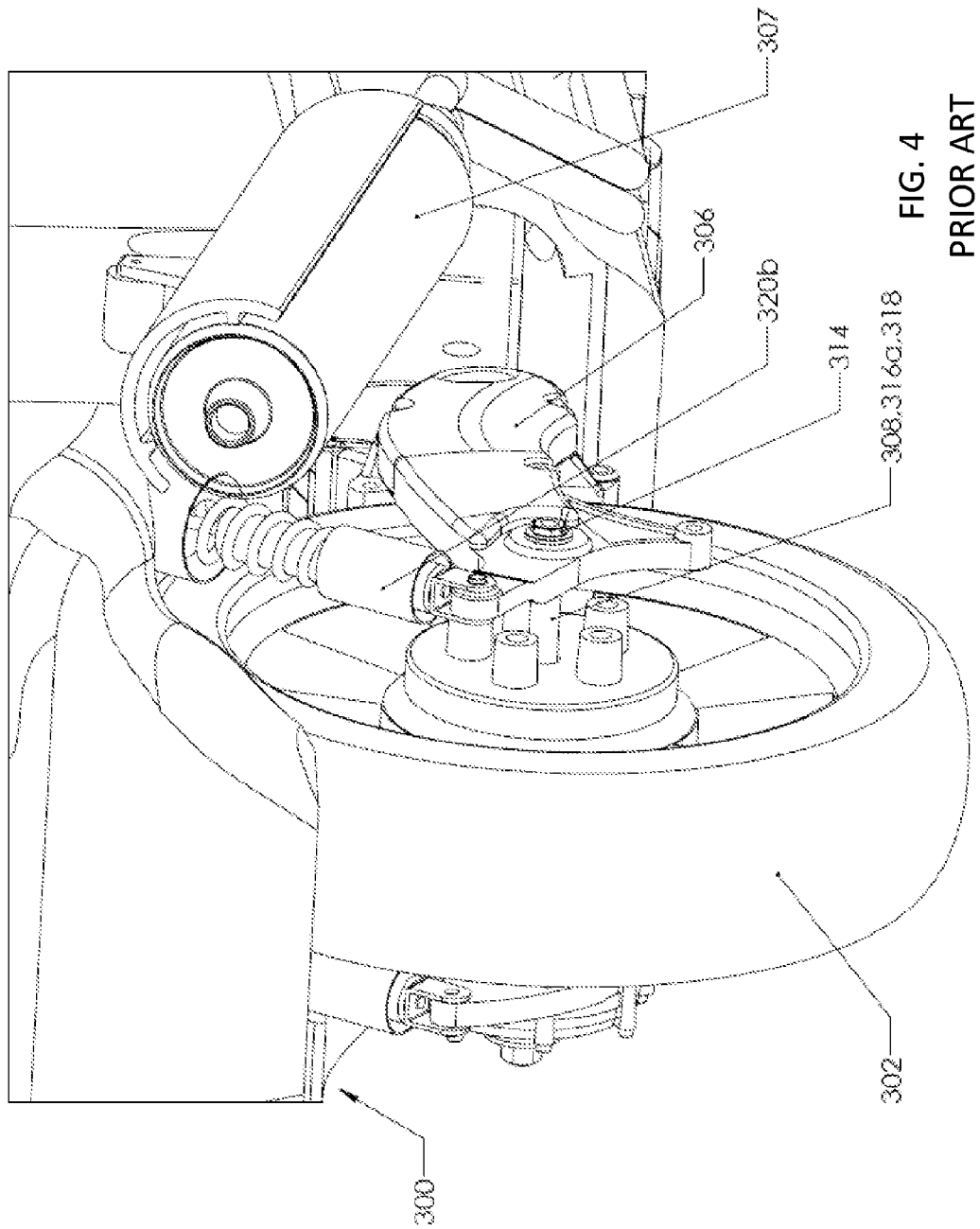
FIG. 4 is an enlarged right rear perspective view of the motorcycle of FIG. 1.

The motorcycle 300 also has a shock absorber 320a engaged with the transfer case 304, and a shock absorber 320b engaged with the swing arm 306 (best seen in FIGS. 3 and 4). The shock absorbers 320 are engaged to the rear portion of the motorcycle 300, below the rider seat, taillights and rear storage compartments. An exhaust 307, which extends adjacent to the swing arm 306 on the rear right side, flanks the rear portion of the motorcycle 300. A person having ordinary skill in the art understands that, together, the transfer case 304, the swing arm 306, and the shock absorbers 320 function to pivotally hold and suspend the rear wheel 302 in a fixed, limited space on the rear portion of the motorcycle 300.

The transfer case 304 shown in FIGS. 1-4 has both its outer and inner case covers removed and, therefore, the original attachment means 310 for engaging the inner case cover to the transfer case 304 is also removed (14 total screws in this particular embodiment). The rear wheel 302 and the swing arm 306 have the entire rear brake assembly of the motorcycle 300 (e.g., its brake lock cable and brake caliper) disengaged and swung out of the view.

An original axle bolt head 312 (on the left side of the motorcycle) and an original axle nut bolt/cotter pin 314 (on the right side of the motorcycle) prevent the original axle 308 from sliding out from the original rear drive assembly of the motorcycle 300. The rear wheel 302 is directly engaged with the transfer case 304 such that any engine work is transmitted and output as rear wheel rotation (best seen in FIG. 3). A person having ordinary skill in the art understands that the rear wheel 302 is engaged in a complementary fashion with a splined hub 322 (best seen in FIG. 5) internal to the transfer case 304. As the splined hub 322 rotates within the transfer case 304, the rear wheel 302 also rotates.

The rear wheel 302 is spaced from the swing arm 306 by a hollow spacer 316a and a hollow collar 318 (best seen in FIG. 4). Although the rear wheel 302 is directly engaged with the transfer case 103, the transfer case 304 also has an internal hollow spacer 316b that extends from one side of the transfer case 304 to the other side of the transfer case 304 through the splined hub 322. The original axle 308 traverses the hollow spacer 316b, the rear wheel 302, the hollow spacer 316a and the hollow collar 318 as it extends from the transfer case 304 to the swing arm 306. The original axle bolt head 312 and the original axle nut bolt/cotter pin 314 append the original axle 308.

Figure 5:
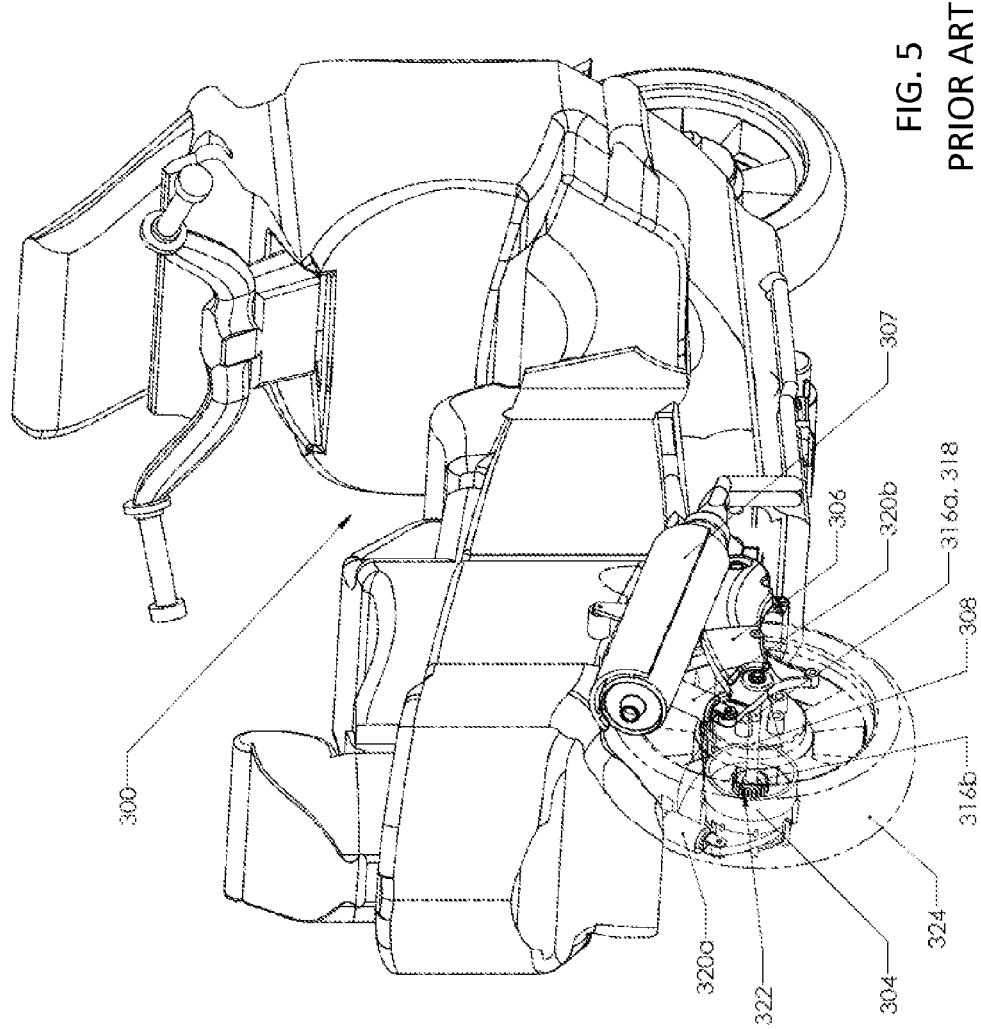
FIG. 5 is a right rear perspective view of the motorcycle of FIG. 1 without its rear wheel.

FIG. 5 is a right rear perspective view of the motorcycle 300 without the rear wheel 302. The general space around the transfer case 304, the swing arm 306, the exhaust 307, and the rear portion of the motorcycle 300 define a void 324. The void 324 encompasses the space wherein the rear wheel 302 would engage, wherein a buffer-zone around the spinning rear wheel 302 would extend, and wherein the structural integrity and the safe operating function of add-ons to the motorcycle 300 would not be compromised. The void 324 is, therefore, an ideal place to position the present invention.

Figure 6:
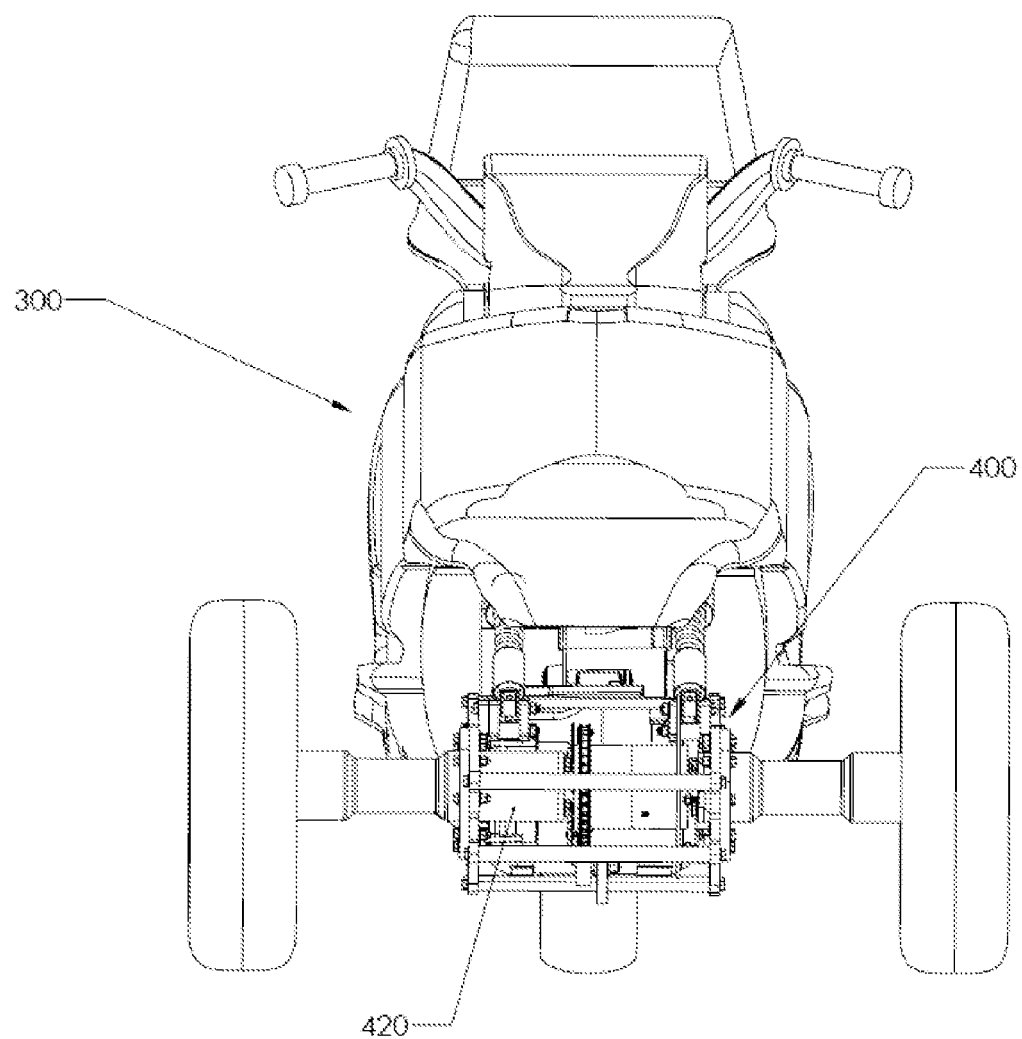
FIG. 6 is a rear perspective view of the motorcycle of FIG. 1 as modified by a first embodiment of the conversion kit of the present invention.
Figure 7A:
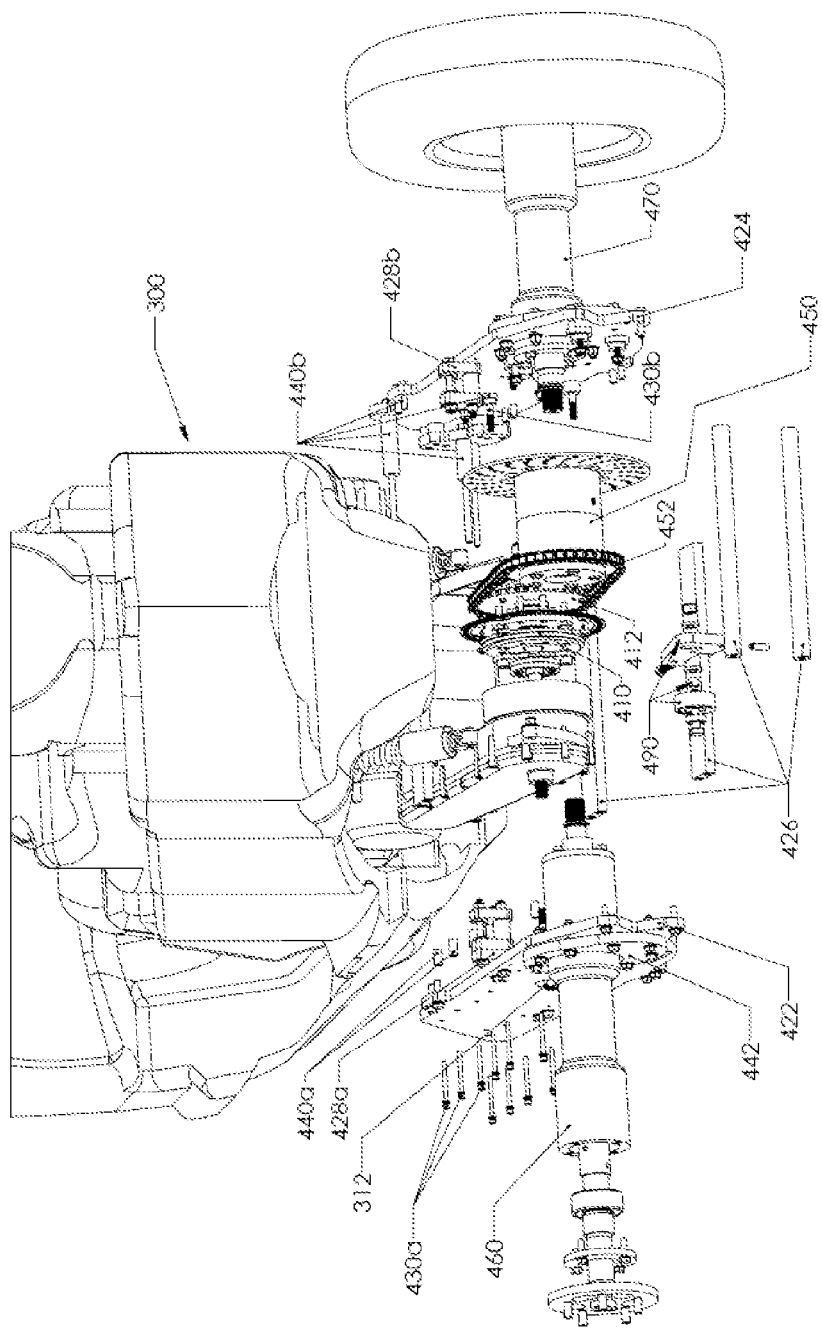
FIG. 7A is an exploded left rear perspective view of a conversion kit of the present invention on the modified motorcycle of FIG. 6.
Figure 7B:
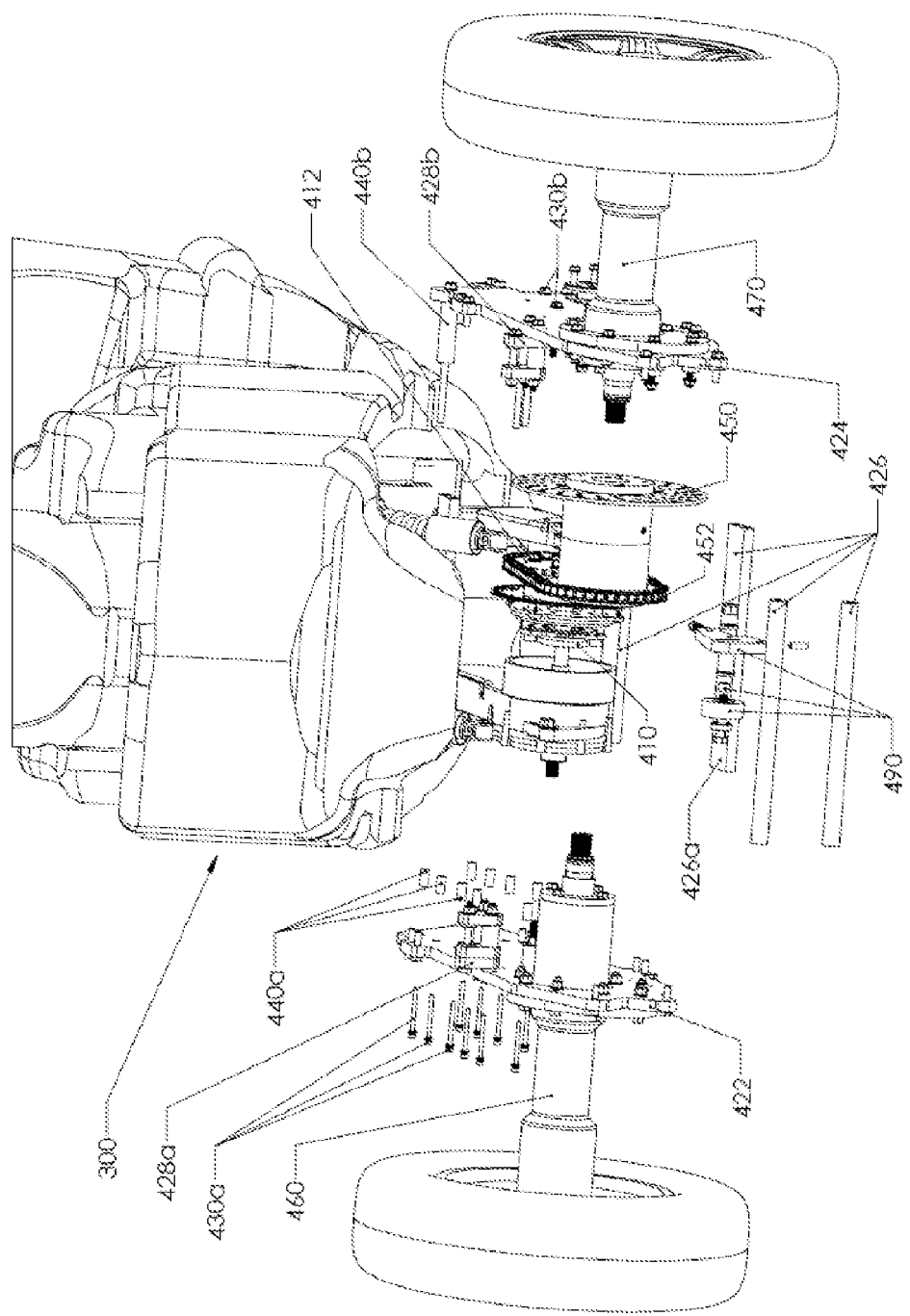
FIG. 7B is an exploded right rear perspective view of a conversion kit of the present invention on the modified motorcycle of FIG. 6.

Referring to FIG. 6, this is a rear perspective view of the motorcycle 300 with a first embodiment of the present invention attached. More specifically, a conversion kit 200 is positioned within the void 324 and attached to the motorcycle 300. The exhaust 307 extends, unchanged and unmoved, adjacent to the conversion kit 200 on the rear right side of the motorcycle 300. The rider seat, the taillights, and the rear storage compartments are also unchanged and unmoved.

Referring to FIGS. 7A, 7B, and 8-15, these are partial exploded perspective views of a conversion kit 200 according to the present invention. The conversion kit 200 comprises a transfer case adaptor 410, a box frame 420, a means for attaching 430, a means for spacing 440, a drive and brake assembly 450, a first axle assembly 460, a second axle assembly 470, a chain 480, and a chain wheel 490 (best seen in FIGS. 7A and 7B). The conversion kit 200 may include various other components, such as, for example, box frame paneling, transmission and suspension extensions, coverings, screws, bolts, nuts, tubings, hydraulics, wires, cables, gears, axles, and sprockets, etc.

The transfer case adaptor 410 is directly engaged up against the transfer case 304 of the motorcycle 300 in much the same way as the original rear wheel 302. Generally, the transfer case adaptor 410 is configured to replace the rear wheel 302 such that, instead of driving a larger diameter wheel and tire, the transfer case drives a smaller diameter first drive sprocket 412 without need for significant modification or addition to the original rear drive assembly. The first drive sprocket 412 has a plane of rotation equal to the plane of rotation of the original rear wheel 302.

More specifically, as the splined hub 322 rotates within the transfer case 304, the first drive sprocket 412 also rotates about the original axle 308. The original axle 308 traverses the hollow spacer 316b, the transfer case adaptor 410, and the hollow spacer 316a, as it extends from the transfer case 304 to the swing arm 306. The hollow collar 318 and the original axle nut bolt/cotter pin 314 are replaced by a first secondary add-on 414 configured to append the original axle 308 on the end opposite the original axle bolt head 312. The first secondary add-on 414 functions as an anchoring, and rotation point, for the original axle 308 relative to the swing arm 306 and the box frame 420 (described in greater detail herein).

The box frame 420 is engaged to the transfer case 304, the swing arm 306, the first secondary add-on 414 and the shock absorbers 320. The box frame 420 surrounds the now modified original rear drive assembly, and any add-on internal moving parts, of the conversion kit 200. The already existing chassis, suspension, and support structures associated with the rear portion of the motorcycle 300 support the box frame 420 such that the box frame 420 is pivotally held and/or suspended in the void 324. The box frame 420, therefore, allows the conversion kit 200 to leverage the substantially unmodified rear portion, and most previously existing chassis, framework, transmission, suspension, hydraulic, pneumatic, etc. components of the motorcycle 300.

The box frame 420 comprises a transfer case side plate 422, a swing arm side plate 424, cross bars/stiffening rods 426, and shock absorber attachment assemblies 428. The plurality of cross bars/stiffening rods 426 directly couple the transfer case side plate 422 with the swing arm side plate 424 and are positioned in places where the original components of the rear portion of the motorcycle 300 are not. The plurality of cross bars/stiffening rods 426 may provide an anchor point upon which other components of the original motorcycle 300 and/or the invention engage (best seen in FIGS. 7A and 7B; 490).

Figure 8:
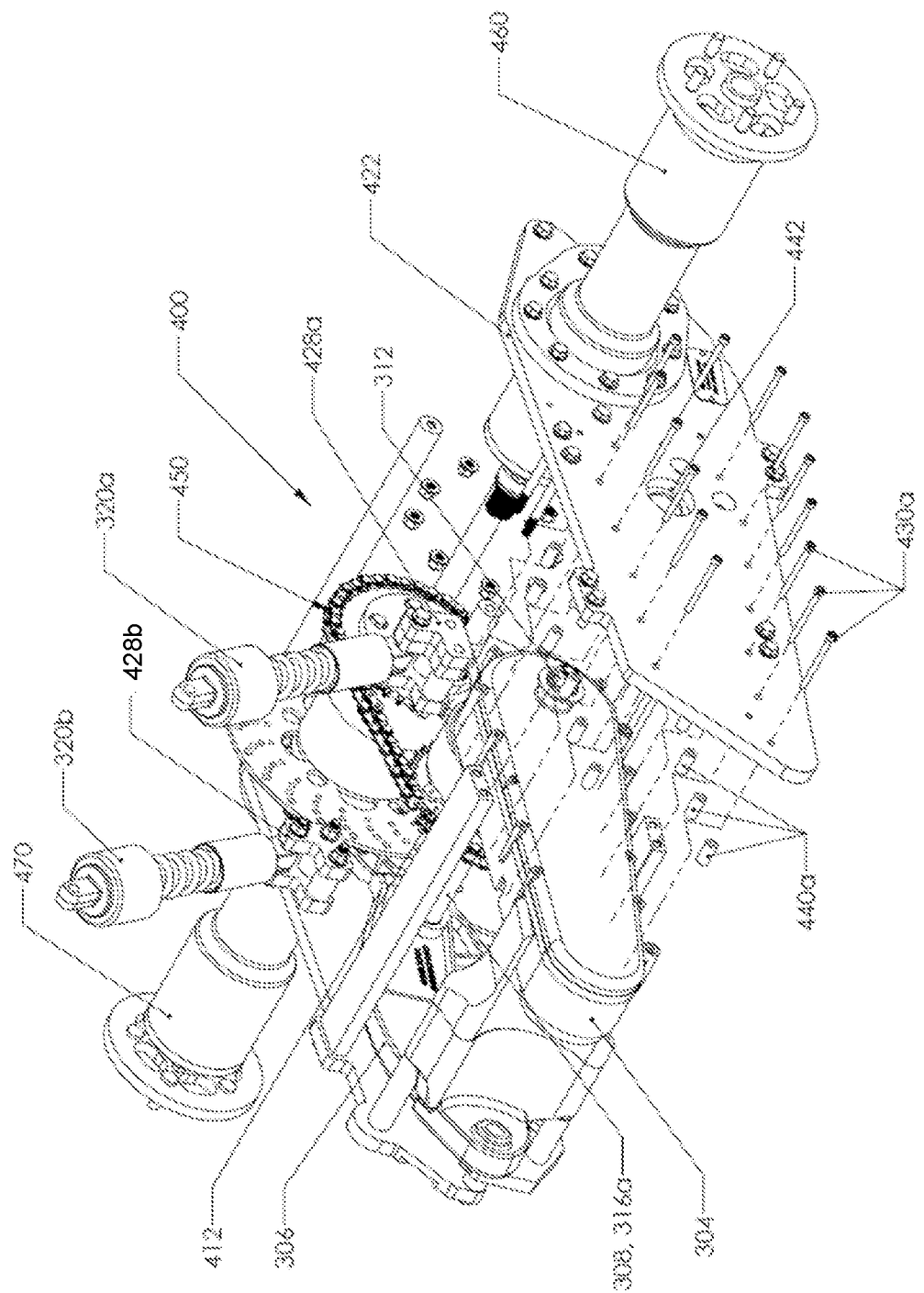
FIG. 8 is a partial exploded left front perspective view of the conversion kit of FIG. 6.
Figure 9:
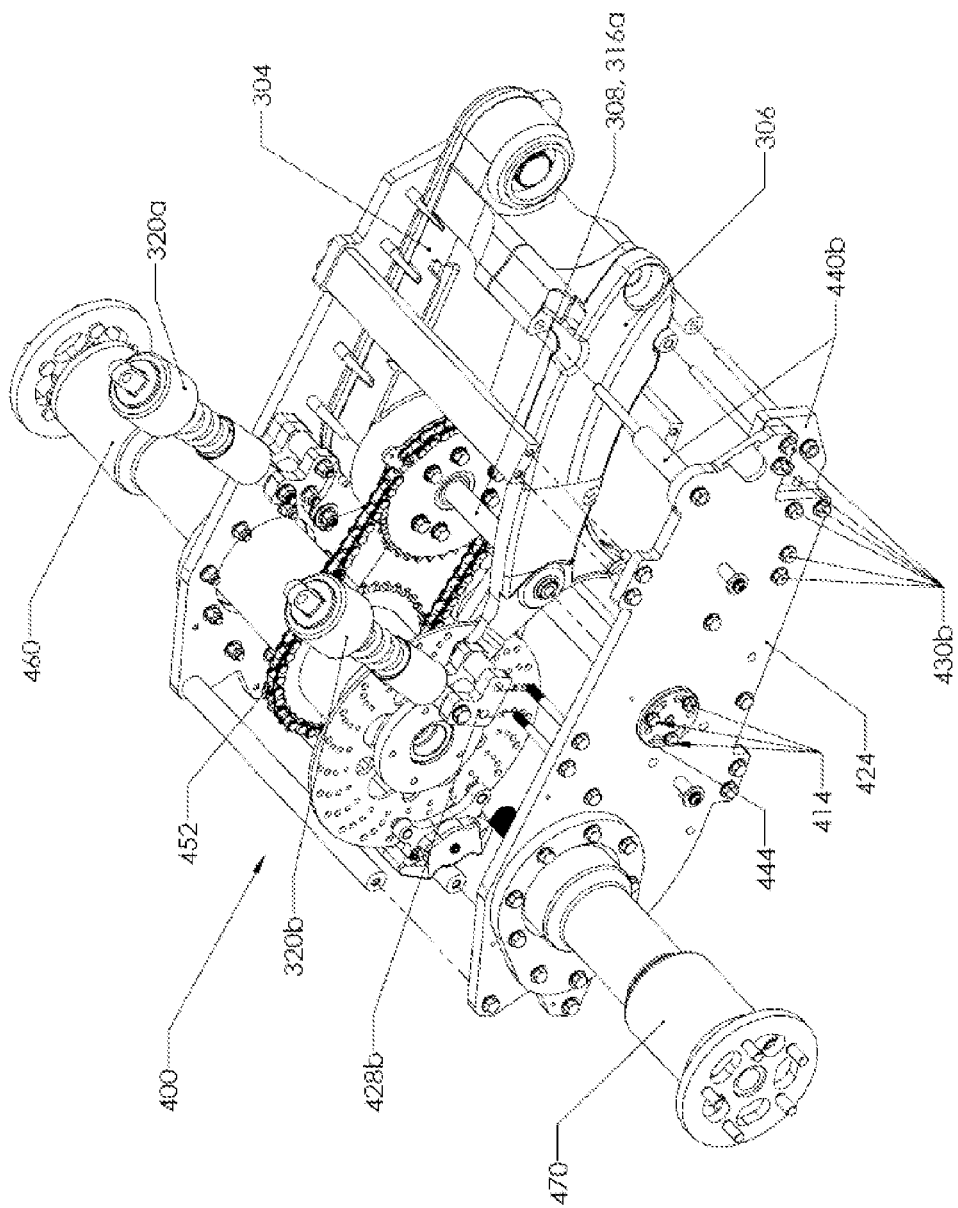
FIG. 9 is a partial exploded right front perspective view of the conversion kit of FIG. 6.
Figure 11B:
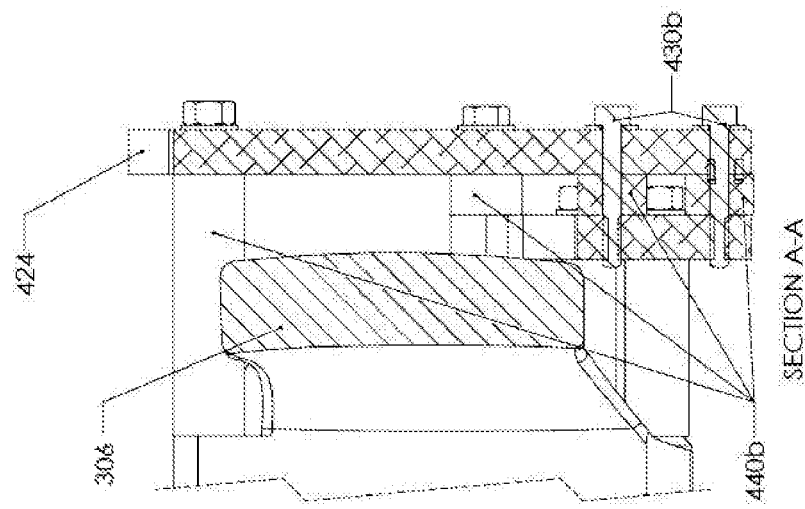
FIG. 11B is a sectional view along line A-A of FIG. 11A.
Figure 11A:
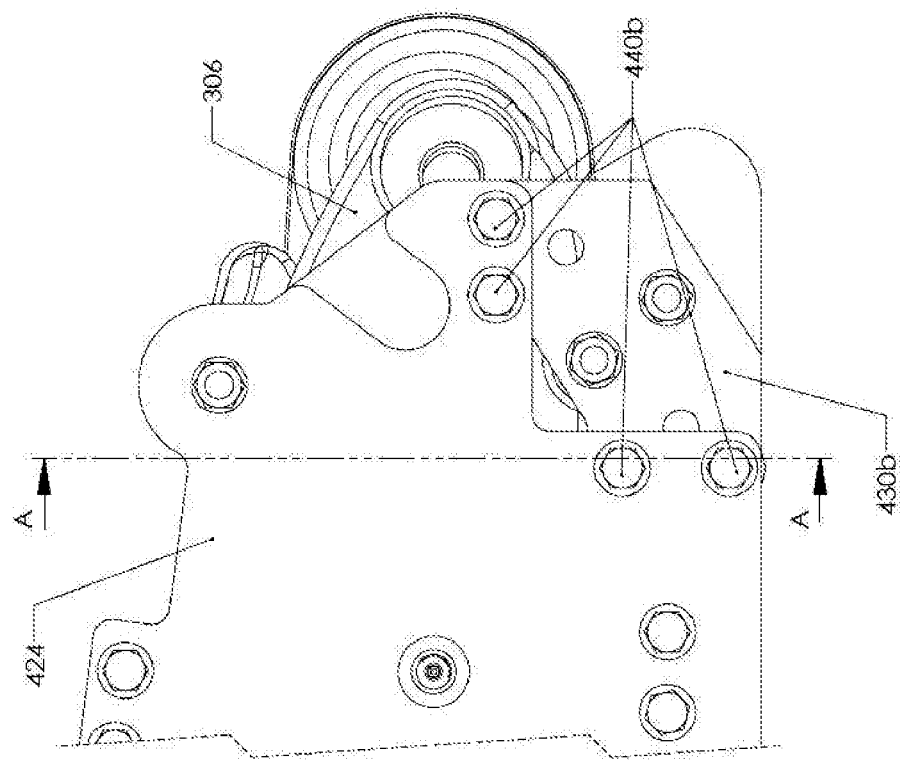
FIG. 11A is a partial right side perspective view of the conversion kit of FIG. 6.
Figure 12:
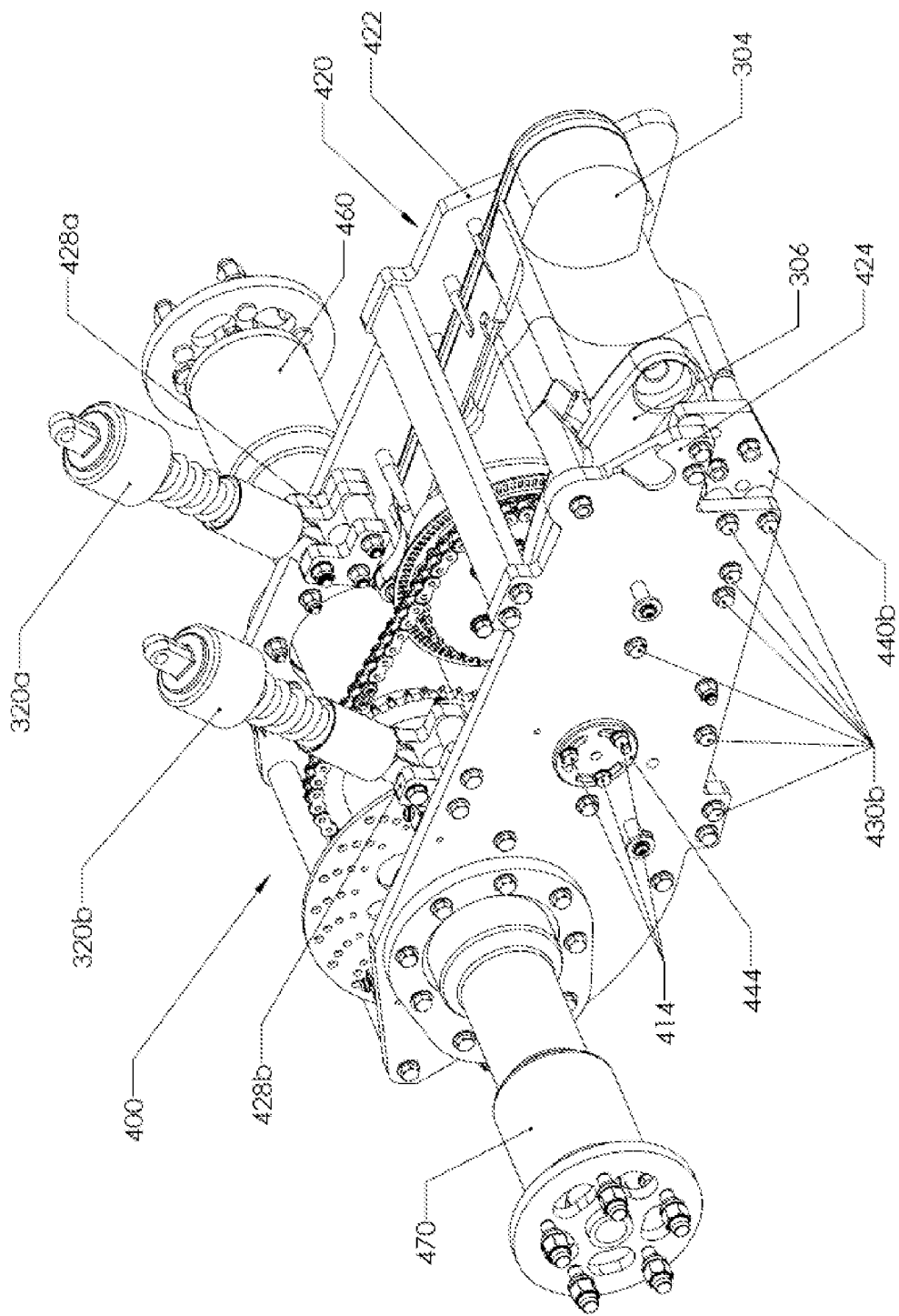
FIG. 12 is a right front perspective view of the fully assembled conversion kit of FIG. 6.
Figure 13:
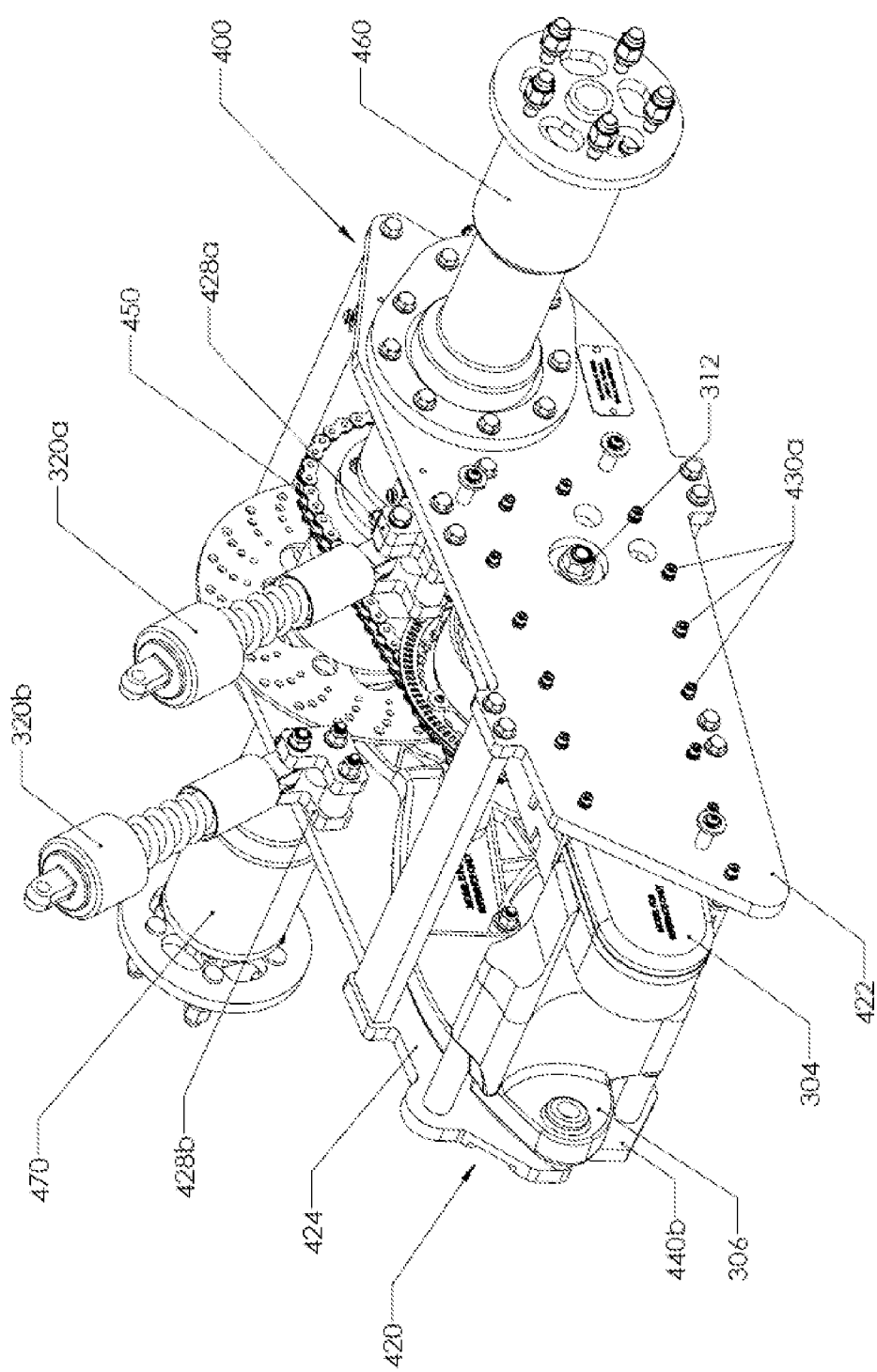
FIG. 13 is a left front perspective view of the fully assembled conversion kit of FIG. 6.
Figure 14:
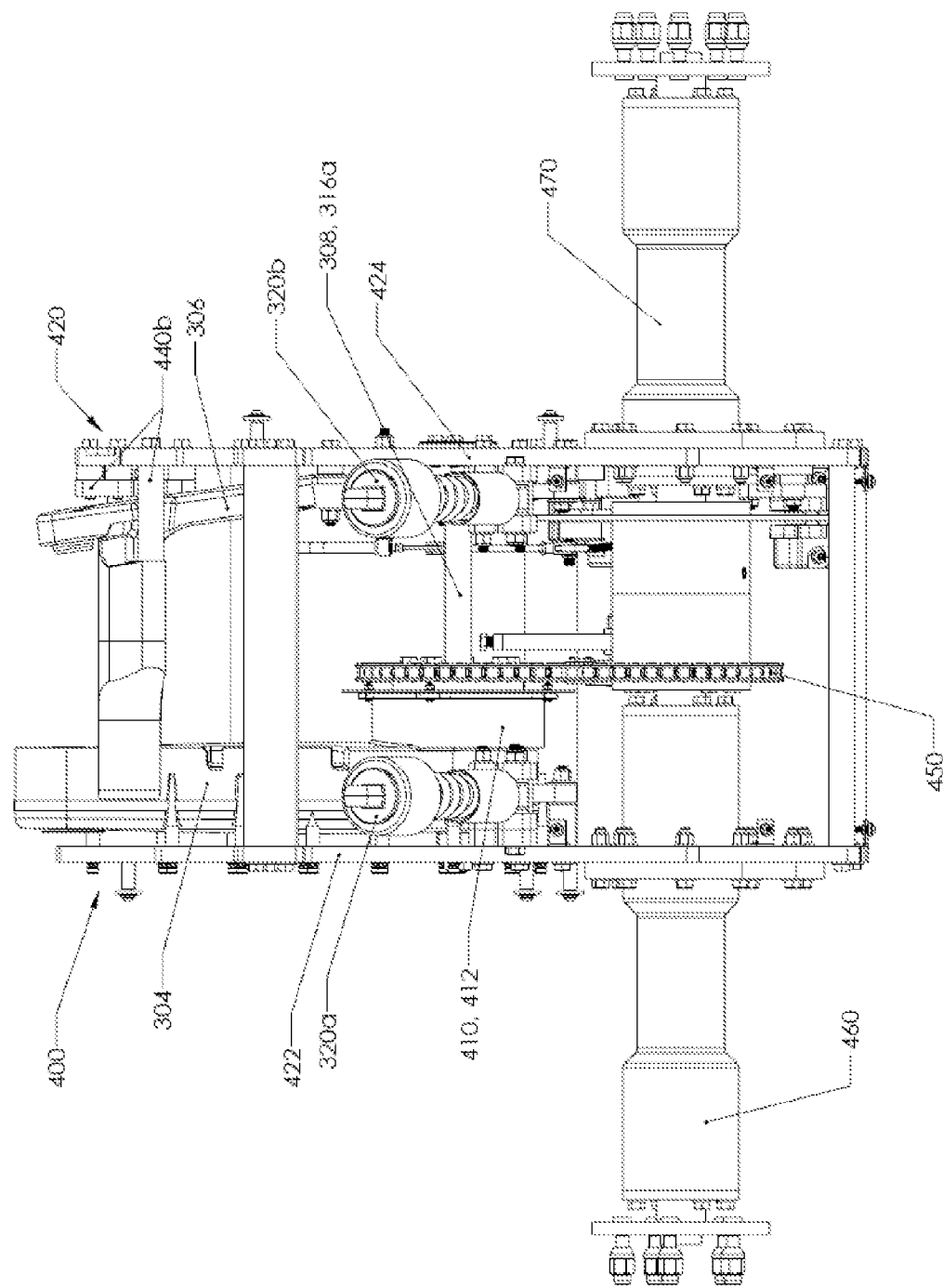
FIG. 14 is a top perspective view of the fully assembled conversion kit of FIG. 6.
Figure 15:
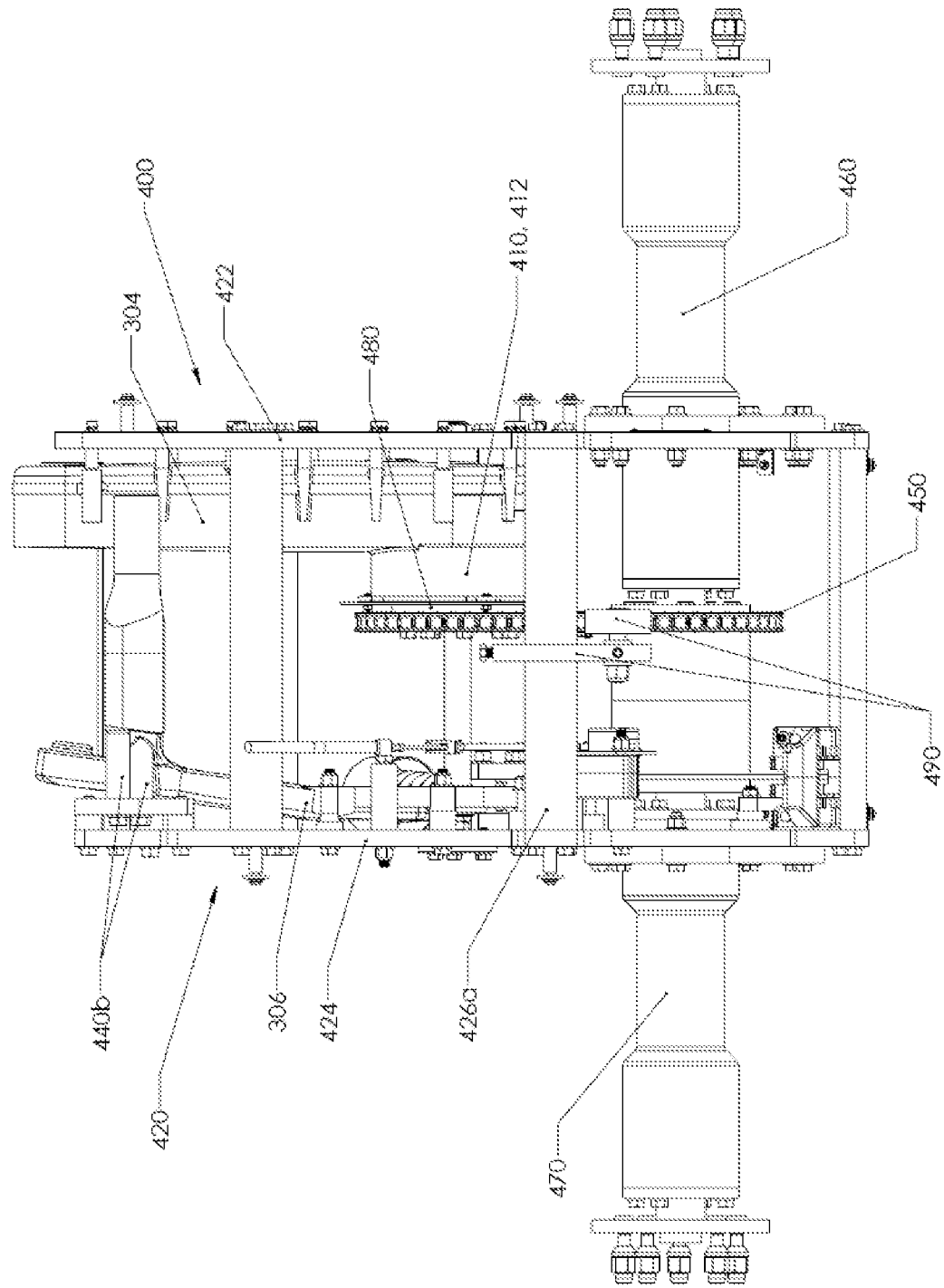
FIG. 15 is a bottom perspective view of the fully assembled conversion kit of FIG. 6.

The transfer case side plate 422 is engaged with the transfer case 304 via the means for attaching 430a and the means for spacing 440a (best seen in FIG. 8 and described in greater detail herein). The swing arm side plate 424 is engaged with the swing arm 306 via the means for attaching 430b and the means for spacing 440b (best seen in FIG. 9 and described in greater detail herein). The box frame 420 is engaged with the shock absorbers 320 via the shock absorber attachment assemblies 428 without need for a modified position or a modified relationship with the motorcycle 300.

The drive and brake assembly 450 is positioned within the confines of the box frame 420 and is offset or set back from (i.e., not coaxial with) the transfer case 304, the transfer case adaptor 410, and the first drive sprocket 412. The first axle assembly 460 and the second axle assembly 470 extend through, and are rigidly engaged with, the transfer case side plate 422 and the swing arm side plate 424, respectively. The drive and brake assembly 450 is engaged with the first axle assembly 460 and the second axle assembly 470 such that the drive and brake assembly 450 is retained within the box frame 420, and such that the first drive sprocket 412 of the transfer case adaptor 410 is aligned with the second drive sprocket 452 of the drive and brake assembly 450.

The second drive sprocket 452 has a plane of rotation coplanar with, and rearwardly offset within, the plane of rotation of the first drive sprocket 412 of the transfer case adaptor 410. The chain 480 links the first drive sprocket 412 and the second drive sprocket 452 such that, via transmission input from the transfer case 304, the drive and brake assembly 450 rotates the trike rear wheels as output. As the first drive sprocket 412 drives the chain 480, the hanging portion of the chain 480 can rest on a chain wheel 490. The chain wheel 490 facilitates the chain 480 remaining in proper contact with the teeth of the sprockets 412, 452, as is understood by one having ordinary skill in the art.

The swing arm side plate 424, and/or the swing arm 306, anchors and positions the original brake lock cable, the original brake caliper, and any other original rear brake assembly component, to operate on the drive and brake assembly 450. The cross bar/stiffening rod 426a anchors and positions the chain wheel 490 between the transfer case side plate 422 and the swing arm side plate 424, and below the second drive sprocket 452 of the drive and brake assembly 450 (best seen in FIG. 15). The offset or set back between the drive and brake assembly 450 and the transfer case 304 and/or transfer case adaptor 410, and between the first drive sprocket 412 and the second drive sprocket 452, allows the conversion kit 200 to safely leverage the power output from the original rear drive assembly without compromising the structural stability, balance, ride quality, and general footprint of the motorcycle 300. More specifically, the transfer case side plate 422, the first axle assembly 460, the means for attaching 430a, the means for spacing 440a, and the original axle bolt head 312 extend out from the transfer case 304. The transfer case side plate 422 is engaged with the first axle assembly 460.

The means for attaching 430a comprises the original means for attaching 310 of the motorcycle 300 (best seen in FIG. 3 showing an exemplary 14 total screws in this illustrative embodiment). Generally, the means for attaching 430a is configured to attach the transfer case side plate 422 to the transfer case 304 in a similar fashion as the original inner case cover of the transfer case 304. The means for attaching 430a leverages the original screw hole pattern along the periphery of the outside of the transfer case 304. The transfer case 304 is not modified in any substantial way. The means for attaching 430a is also configured to cooperate with the means for space 440a of the conversion kit 400.

The means for spacing 440a are cylindrical spacers through which the means for attaching 430a traverse as they extend through the transfer case side plate 422 to their corresponding screw hole on the transfer case 304. The means for spacing 440a separates the transfer case side plate 422 from the outside of the transfer case 304 (best seen in FIG. 10A). The means for spacing 440a can be configured to dampen vibrations extending between the transfer case 304 and the transfer case side plate 422. The means for spacing 440a also can be configured to level the transfer case side plate 422 off of the transfer case 304 such that, when the swing arm side plate 424 is engaged with the swing arm 306, the transfer case side plate 422 is parallel with the swing arm side plate 424.

The original axle bolt head 312 appends the original axle 308 as it traverses the hollow spacer 316b, the transfer case adaptor 410, and the hollow spacer 316a, as it extends from the transfer case 304 to the swing arm 306. The original axle bolt head 312 is engaged up against to a recess/aperture 442 defined along the outside of the transfer case side plate 422.

The swing arm side plate 424, the second axle assembly 470, the means for attaching 430b, the means for spacing 440b, and the first secondary add-on 414 extend out from the swing arm 306. The swing arm side plate 422 is engaged with the second axle assembly 470.

The means for attaching 430b is similar to the means for attaching 430a. Generally, the means for attaching 430b is configured to attach the swing arm side plate 424 to the swing arm 306. Unlike the transfer case side plate 422, the swing arm side plate 424 does not sit in the place of another original motorcycle 300 component; instead, the swing arm side plate 424 is engaged along the outside of the swing arm 306. The means for attaching 430b leverages the original points of attachment used by original rear drive and brake assembly components. The swing arm 306 is not modified in any substantial way. The means for attaching 430b is also configured to cooperate with the means for space 440b of the conversion kit 400.

The means for spacing 440b are a varied combination of components configured to complement the differently contoured portions along the outside of the swing arm 306. Some of these components complement the forward most end of the swing arm 306. The means for attaching 430b traverse the means for spacing 440b at certain points as they extend through the swing arm side plate 424 to their corresponding screw hole on the swing arm 306. The means for spacing 440b separates the swing arm side plate 424 from the outside of the swing arm 306. The means for spacing 440b can be configured to dampen vibrations extending between the swing arm 306 and the swing arm side plate 424. The means for spacing 440b may also be configured to level the swing arm side plate 424 off of the swing arm 306 such that, when the transfer case side plate 422 is engaged with the transfer case 304, the swing arm side plate 424 is parallel with the transfer case side plate 422 (best seen in FIG. 11B).

The first secondary add-on 414 appends the original axle 308 as it traverses the hollow spacer 316a, the transfer case adaptor 410, and the hollow spacer 316b, from the swing arm 306 to the transfer case 304. The first secondary add-on 414 is engaged up against to a recess/aperture 444 defined along the outside of the swing arm side plate 424. The first secondary add-on 414 is anchoring the original axle 308 to the swing arm side plate 424 and to the swing arm 306 such that the original axle 308 rotates about its longitudinal axis.

Figure 16:
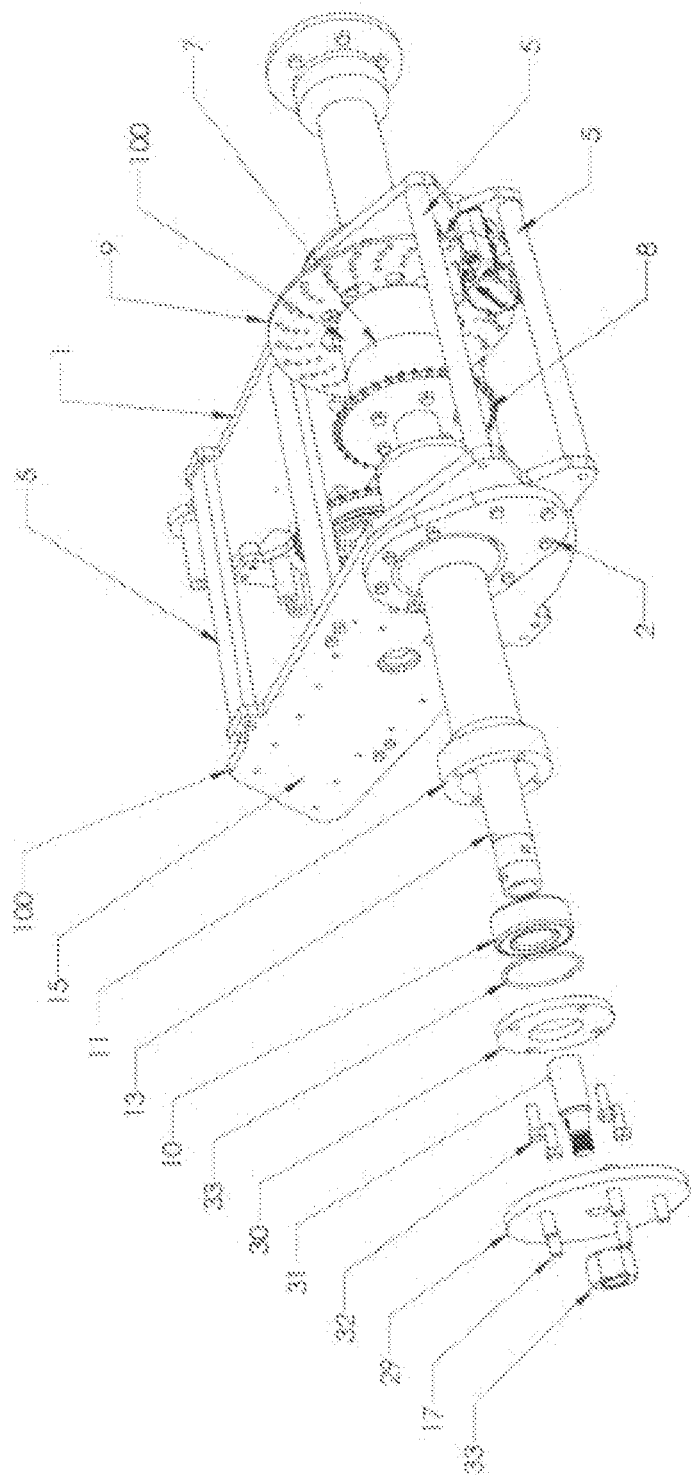
FIG. 16 is a rear left perspective view of an alternative embodiment of the present invention suitable for use with a drive chain.

Referring to FIG. 16, this is a rear perspective view of a first alternative embodiment of the present invention suitable for use with a drive chain. Two side plates 4 are connected by stiffening rods or cross bars 5 and by front mounted inner supports 6. These form a high strength box frame 110 (analogous to box frame 420) that holds the differential halves 7 containing the differential assembly 100. A sprocket or pulley 8 (analogous to second drive sprocket 452) and disc brake 9 are machined to accept the end of the bearing 10 on each end of the differential halves 7. This mostly eliminates the need for adaptors and the bearings 10 act as a centering guide for the sprocket 8 and disc brake 9 to ensure that they are in alignment.

Figure 17:
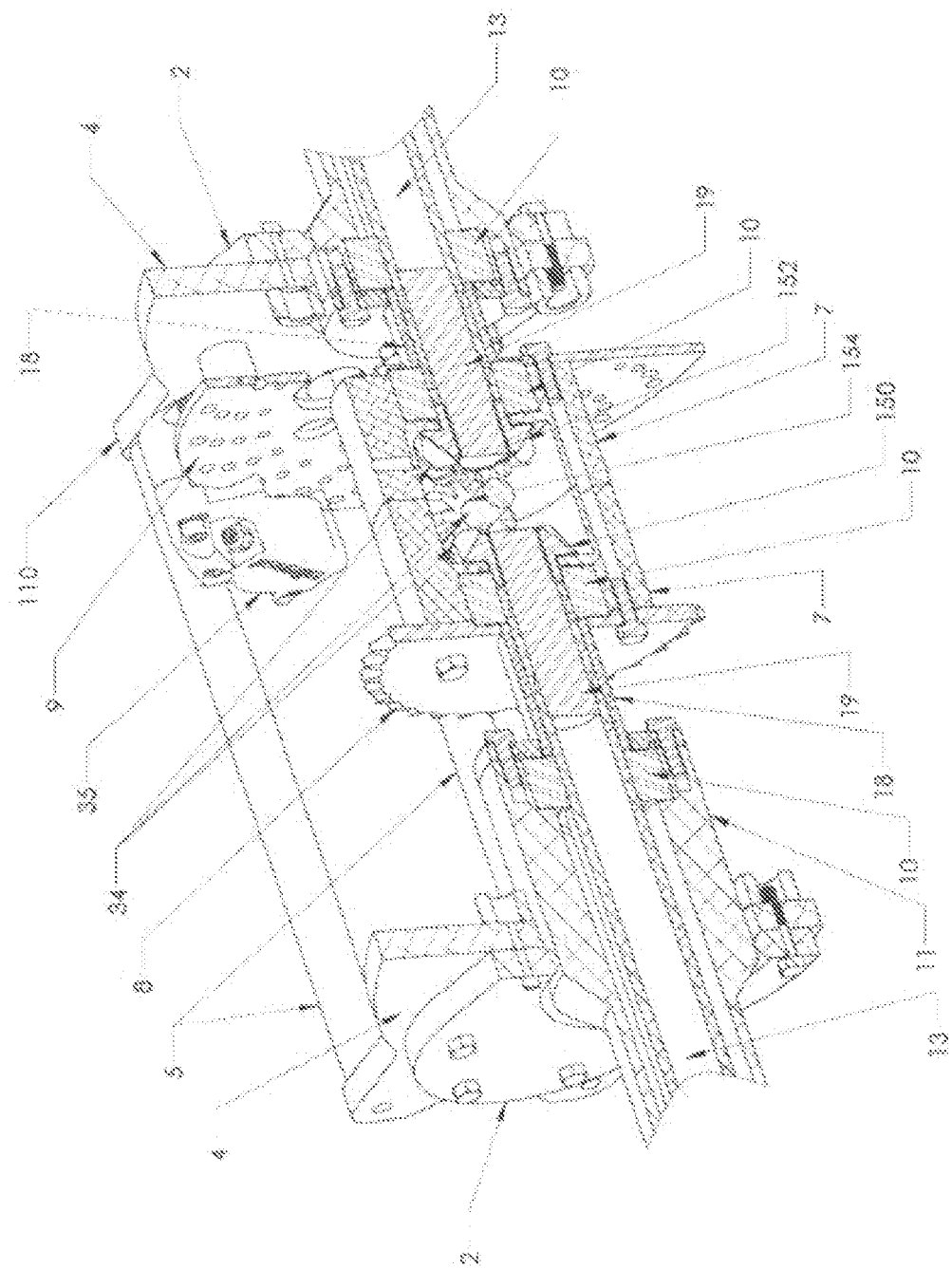
FIG. 17 is a rear sectional view of the embodiment of FIG. 16 showing a non-straddle differential and hollow axles of the present invention.

Referring to FIG. 17, this is a rear sectional view of the embodiment of FIG. 16 showing a non-straddle differential assembly 100 and hollow axles of the present invention. FIG. 17 provides additional detail showing the axles 13 mating into the differential assembly 100 and engaging the spider gears 34. In this example alternative embodiment, the differential assembly 100 is driven by a sprocket 8 and braked by a disc brake 9 with a fixed caliper 35. This allows the trike to brake both wheels with only one disc brake 9. The differential assembly 100 rotates on the ends of the axles 13 and friction is controlled by the use of an inner bearing 10. This allows the differential assembly 100 to be easily moved to any left and right position by changing the length of the axles 13 and spacers 18 to allow the differential assembly 100 to work on a modular basis for different trike rear designs.

Referring to FIGS. 16 and 17, two axle support tubes 11 are bolted to the left and right side of the side plates 4 and extend outwardly from the box or frame 110 formed by side plates 4 and cross bars 5. Axle supports tubes 11 act as rigid extensions of the box or frame 110 to carry the weight of the trike assembly and passenger. Large surface area bearings 10 are at each end of the axle support tubes 11 and support the hollow axle tubing 13. Wheel hubs 29 are drilled for wheel studs 17 to hold the wheels and tires to the trike assembly. Spacing is achieved between components by the use of hollow spacers 18. These allow for the wheel base to be adjusted left or right for centering axle stubs 19 into the differential assembly 100, namely differential halves 7, and differential gears 34. The bearing 10 is held in place by the end cap 30 and the wheel hub assembly is held in place by the tapered shaft 31, mounting block 32, and lock axle nut 33.

Figure 18:
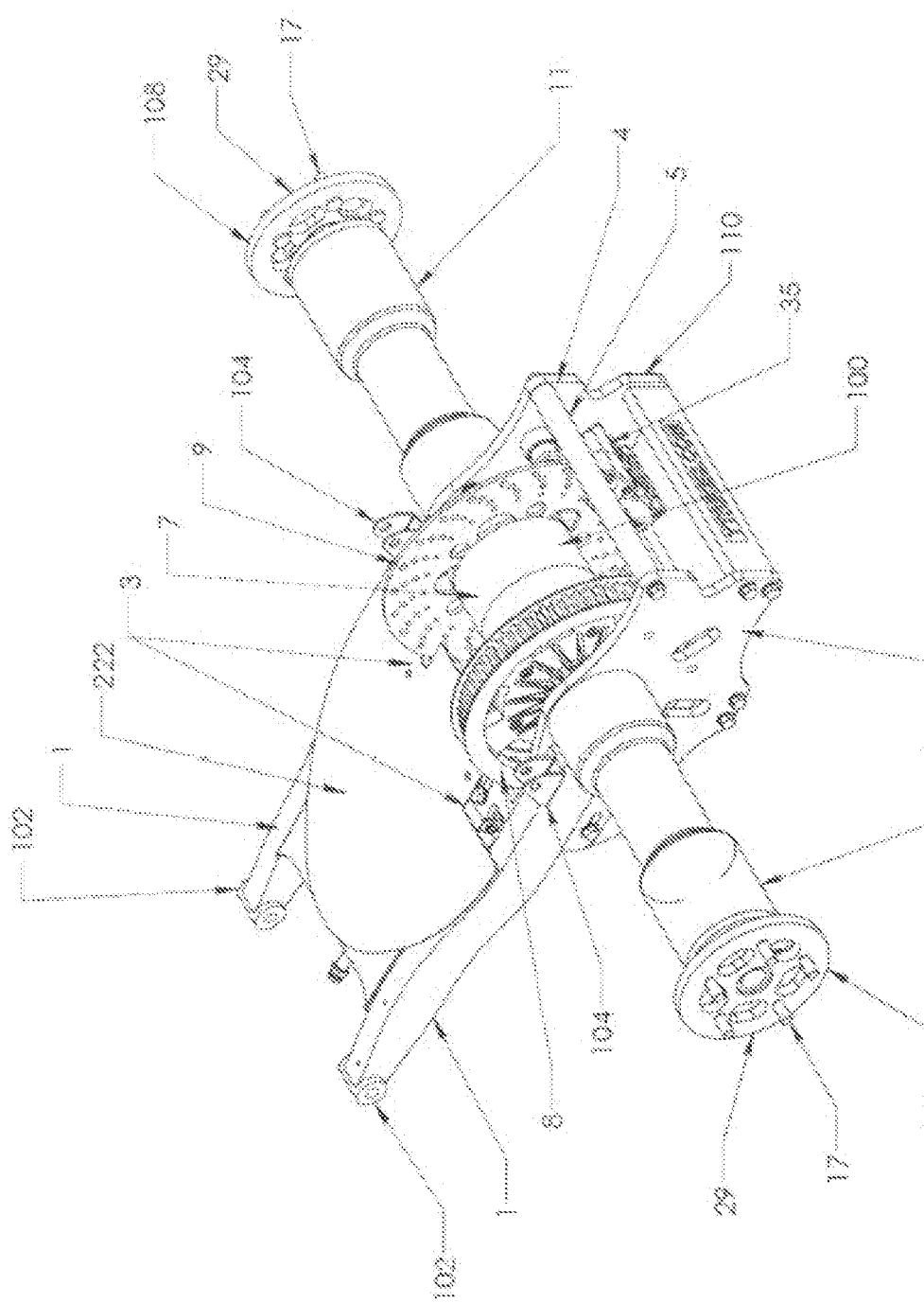
FIG. 18 is a rear perspective view of another alternative embodiment of the present invention suitable for use with a drive belt.

Referring to FIG. 18, this is a rear perspective view of a second alternative embodiment of the present invention suitable for use with a drive belt. This second alternative embodiment has generally the same design, structure and operation as the first alternative embodiment, except for using a sprocket 8 (also analogous to second drive sprocket 420) that cooperates with a drive belt, rather than a drive chain. In FIG. 18, the swing arms 1 are shown along with an overlay plate 2, both of which are installed on the side plates 4. Such overlay plate 2 can be drilled with adjusting holes to allow for drive chain or drive belt (not shown) adjustment. Swing arms 1 are attached to the motorcycle/tricycle frame (not shown) via bearings or attachment points 102. Shock absorbers (not shown) are attached to the swing arms 1 via anchors 104. Thus, the inventive device is attached to and suspended on an original motorcycle frame in a conventional manner using the attachment points 102 and anchors 104 on the swing arms 1.

Also in the second alternative embodiment shown in FIG. 18, two side plates 4 are connected by stiffening rods or cross bars 5 (analogous to cross bars/stiffening rods 426) and by front mounted inner supports 6. These form a high strength box or frame 110 (also analogous to box frame 420) that holds the differential halves 7 containing the differential assembly 100. Sprocket or pulley 8 and disc brake 9 are machined to accept the end of the bearing 10 on each end of the differential halves 7. Two axle support tubes 11 are bolted to the left and right side of the side plates 4 and extend outwardly from the box or frame 110 formed by side plates 4 and cross bars 5. Axle supports tubes 11 act as rigid extensions of the box or frame 110 to carry the weight of the trike assembly and passenger. Large surface area bearings 10 are at each end of the axle support tubes 11 and support the hollow axle tubing 13. Wheel hubs 29 are drilled for wheel studs 17 to hold the wheels and tires to the trike assembly. Spacing is achieved between components by the use of hollow spacers 18, which allow for the wheel base to be adjusted left or right for centering axle stubs 19 into the differential assembly 100, namely differential halves 7, and differential gears 34.

As can be seen, the differential assembly 100, the drive assembly comprising sprocket 8, and the brake assembly comprising disc brake 9 and caliper 35, are contained with the box or frame 110 between side plates 4. This allows the inventive device to operate within the same general footprint as the drive assembly and brake assembly of the original motorcycle.

Figure 19:
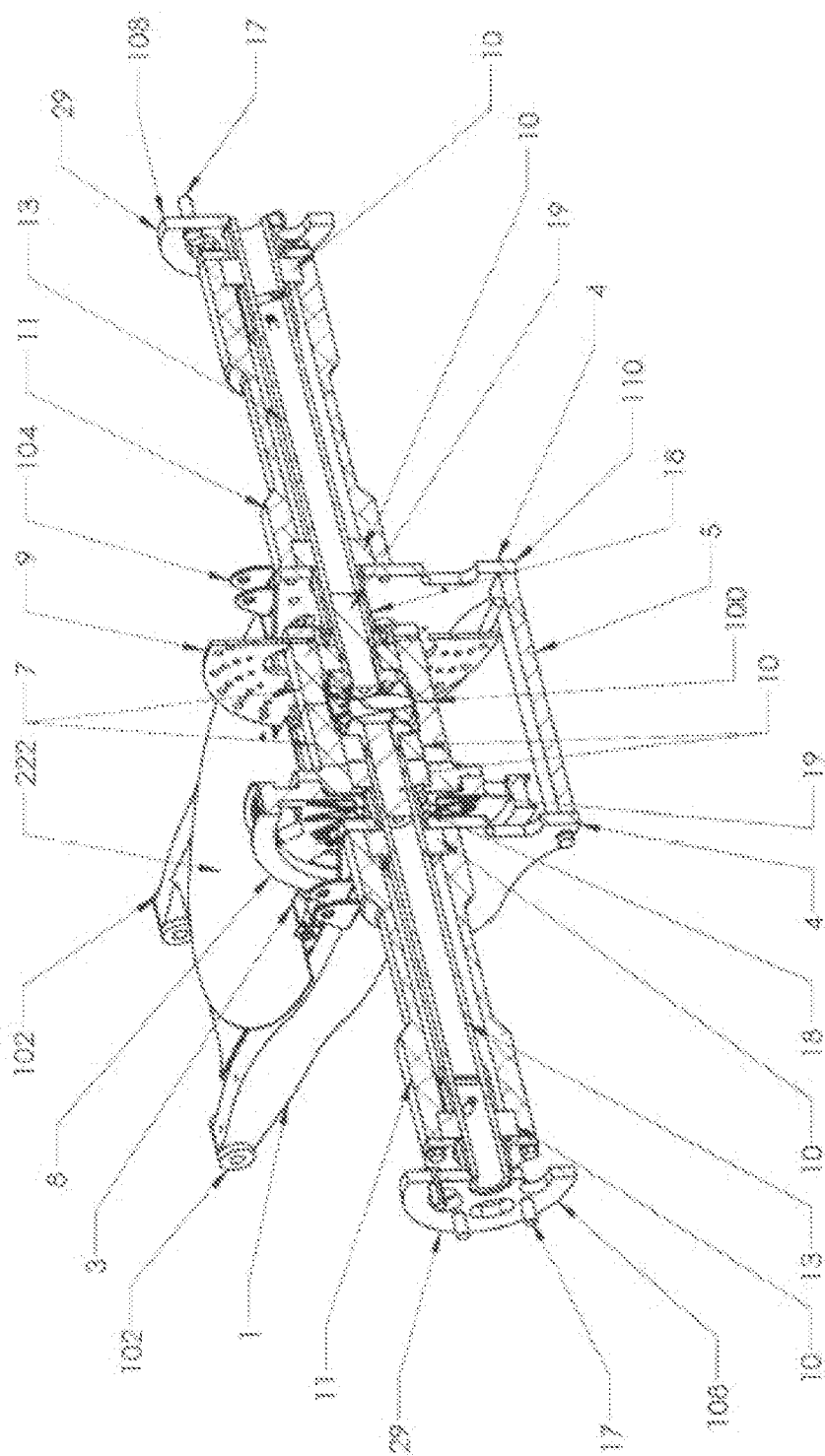
FIG. 19 is a rear sectional view of the embodiment of FIG. 18 showing a non-straddle differential and hollow axles of the present invention.

Referring to FIG. 19, this is a rear sectional view of the embodiment of FIG. 18 showing a non-straddle differential and hollow axles of the present invention. FIG. 19 also provides additional detail showing the axles 13 mating into the differential assembly 100 and engaging the spider gears 34. In this example second alternative embodiment, the differential assembly 100 also is driven by a sprocket 8 and braked by a disc brake 9 with a fixed caliper 35. This allows the trike to brake both wheels with only one disc brake 9. The differential assembly 100 rotates on the ends of the axles 13 and friction is controlled by the use of an inner bearing 10. The axle 13 or the axle stub 19 is replaceable with a component selected from the group consisting of a longer axle 13, a shorter axle 13, a longer axle stub 19, an a shorter axle stub 19, whereby the differential assembly 100 can be located at different locations between the at least two side plates 4 based on the selected component. This allows the differential assembly 100 to be easily moved to any left and right position by changing the length of the axles 13 and spacers 18 to allow the differential assembly 100 to work on a modular basis for different trike rear designs.

Axles 13 can be seen supported within axle support tubes 11 via bearings 10, one bearing preferably located proximal to teach end of each axle 13. With support tubes 11 secured to side plates 4, axles 13 extent through access holes 106 in side plates and are connected on one end to differential spider gears 34 via axle stubs 19. Wheel hub assemblies 108 are attached to another end of axles 13. In this manner, as differential assembly 100, specifically differential spider gears 34, are turned by the engine via the drive chain or belt and the sprocket 8, the axle stubs 19, being connected to the spider gears 34, are turned, thus turning the axles 13 and the wheel hubs 29, thus turning the wheels. Bearings 10 allow for the axles 13 to turn within the axle support tubes 11 with reduced friction. In this manner, the differential spider gears 34 are turned directly by the rotation of the sprocket 8.

Figure 20:
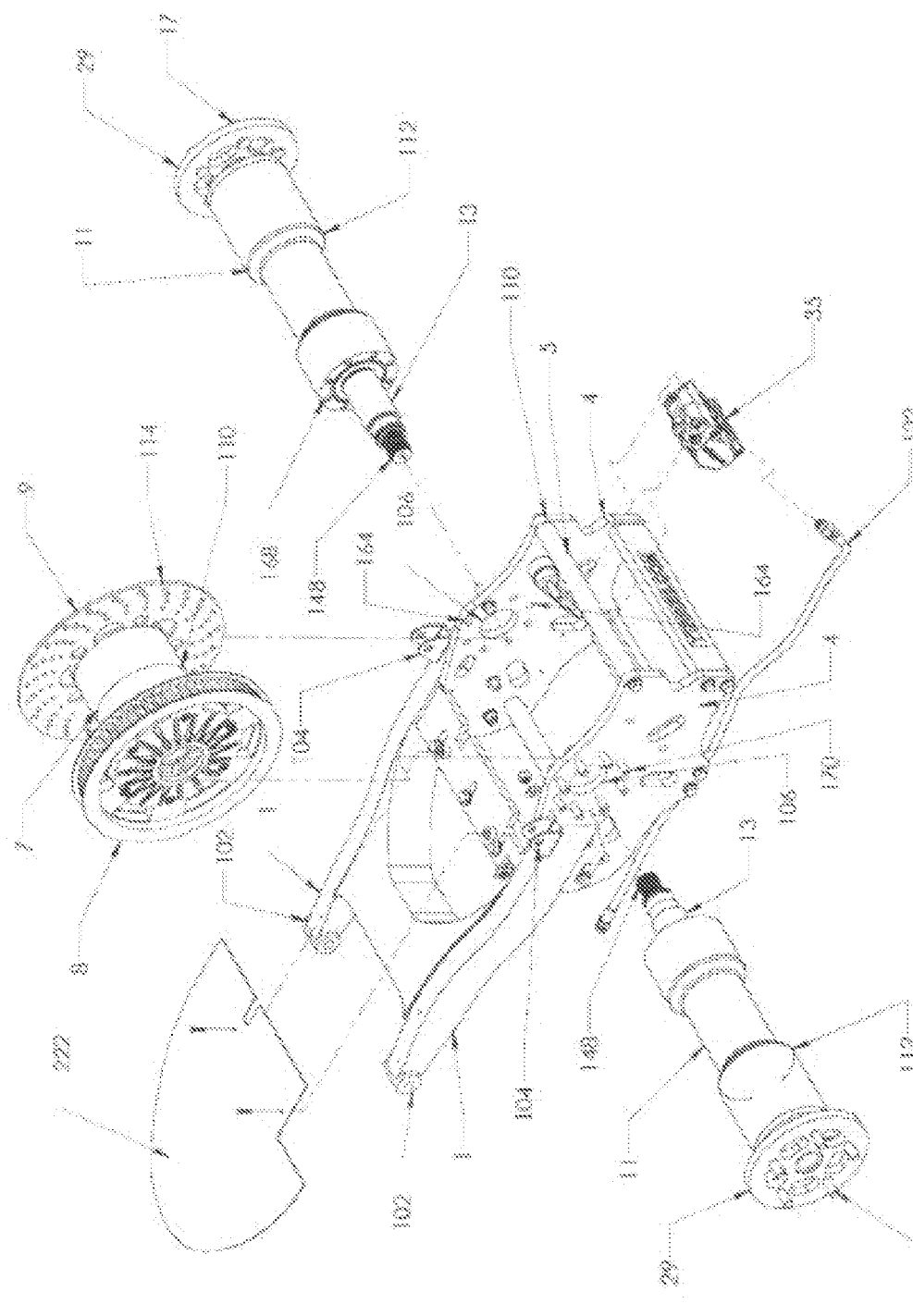
FIG. 20 is an exploded view of the embodiment of FIG. 18.

Referring to FIG. 20, this is an exploded view of the embodiment of FIG. 18, showing the drive assembly 114, the two axle structures 112, the disc brake 9, and the safety plate 2 removed from the support framework, namely, box or frame 110, of the present invention. This view illustrates in more detail two concepts of the present invention. The first concept is that the differential assembly 100 is supported on the axles 13 rather than the differential assembly 100 and axles 13 being supported by a differential housing. The second concept is that the disc brake 9 is attached to the differential assembly 100, and specifically to a differential half 7, such that the rear braking of the trike is achieved by braking the rotation of the differential assembly 100 and therefor the axles 13, and not by braking of the wheels.

In this view, it can be seen that side plates and cross bars 5 form box or frame 110 and that swing arms 1 are secured to the box or frame 110. Safety plate 2 is placed over the swing arms 1 generally to prevent material from the road from spraying up against the bottom of the trike body, but also for other protective and safety reasons. Drive assembly 114 comprises differential assembly 100, sprocket 8 and disc brake 9 is located within the interior of box or frame 110 generally between access holes 106. Drive assembly 114, nor any part of drive assembly 114, is attached to the box or frame 110.

Each of the axle assemblies 112 comprises an axle 13, an axle stub 19, an axle support tube 11, bearings 10, a wheel hub 29, etc. Axle assemblies 112 are attached to the box or frame 110 by inserting an end portion of the axle 13 and/or the axle stub 19 through access holes 106 such that the end portion of the axle 13 and/or the axle stub 19 extend into the interior of the box or frame 110. Bolts 170 can be inserted through bolt holes 164 in side plate 4 from the interior side and threaded into receiving holes 166 on axle support tubes 11 to secure axle support tubes 11 onto side plates 4.

One of the bearings 10 is located between axle 13 and axle support tube 11 proximal to the access hole 106, preventing axle 13 and/or axle stub 19 from contacting the access hole 106. When a first axle assembly 112 is attached to box or frame 110, one axle stub 19 extends through sprocket hole 116 into differential assembly 100 and is secured to a first one of the spider gears 34, namely a first sun gear 150. Also, when a second axle assembly 112 is attached to box or frame 110, one axle stub 19 extends through disc brake hole 118 into differential assembly 100 and is secured to a second one of the spider gears 34, namely a second sun gear 152. In this manner, drive assembly 114 is secured to axles 13 and is supported by axles 13.

As drive assembly 114 is secured only to axles 13, axles 13 can be structured to locate drive assembly 114 anywhere within box or frame 110 between side plates 4. Axles 13 can be made different lengths to locate drive assembly closer to one side plate 4 or the other side plate 4 such that sprocket 8 can be located at a position relative to where drive chain or drive belt is located, which can be dependent on the engine, engine set up, or frame structure of the original motorcycle. For example, a first axle 13 located proximal to the sprocket 8 can be shorter than a second axle 13 located proximal to the disc brake 9 such that drive assembly 114 is located closer to a first side plate 4 opposite the sprocket 8. For another example, a first axle 13 located proximal to the sprocket 8 can be longer than a second axle 13 located proximal to the disc brake 9 such that drive assembly 114 is located closer to a second side plate 4 opposite the disc brake 9. For example, a first axle 13 located proximal to the sprocket 8 can be the same length as, or approximately the same length as, a second axle 13 located proximal to the disc brake 9 such that drive assembly 114 is located approximately centrally within the interior of box or frame 110 between a first side plate 4 opposite the sprocket 8 and a second side plate opposite the disc brake 9.

The disc brake 9 is attached to the differential assembly 100, whereby actuation of the brake 9, 35 acts on the differential assembly 100 to slow the differential assembly 100, and thus slow the axles 13 and wheels. Brake caliper 35 is secured to box or frame 110 at an appropriate position such that brake caliper 35 will interact properly with disc brake 9 so as to brake the drive assembly 100. Hydraulic lines 122 can provide hydraulic fluid to brake caliper 35 for operation in a known manner.

Figure 21:
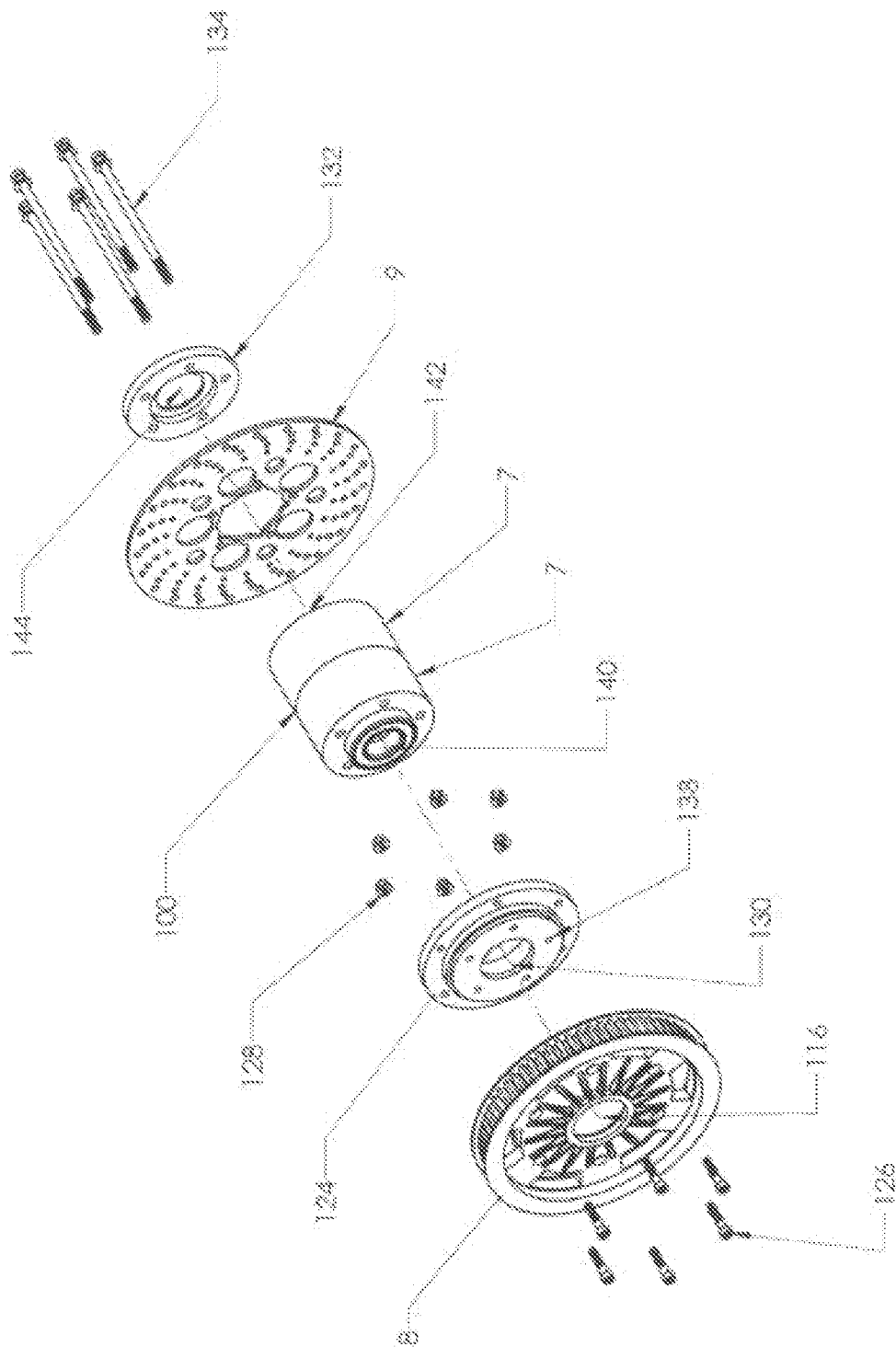
FIG. 21 is an exploded view of the drive assembly of the embodiment of FIG. 18.

Referring to FIG. 21, this is an exploded view of the drive assembly 114 of the embodiment of FIG. 18. Sprocket 8 is attached to mounting plate 124, for example by bolts 126 and nuts 128. Mounting plate 124 has an access hole 130 that aligns with access hole 106 to allow passage of axle 13 and/or axle stub 19 therethrough and also through access hole 140 in a first differential half 7 into differential assembly 100. Disc brake 9 is attached to a second differential half 7 using pressure plate 132, which secures disc brake 9 to the second differential half 7, such that disc brake 9 is sandwiched between pressure plate 132 and the second differential half 7. Bolts 134 extend through pressure plate 132 and disc brake 9 into and through holes or tunnels 136 through differential halves 7, and bolts 134 are secured into cooperating threaded holes 138 in mounting plate 124. Disc brake 9 has an access hole 118 and pressure plate 132 has an access hole 144 that align with access hole 142 in a second differential half 7 to allow passage of axle 13 and/or axle stub 19 therethrough into differential assembly 100. By tightening bolts 134 into mounting plate 124, sprocket 8, mounting plate 124, disc brake 9, and pressure plate 132 are all secured together and to differential assembly 100, and secure differential halves 7 together to form drive assembly 114.

Figure 22:
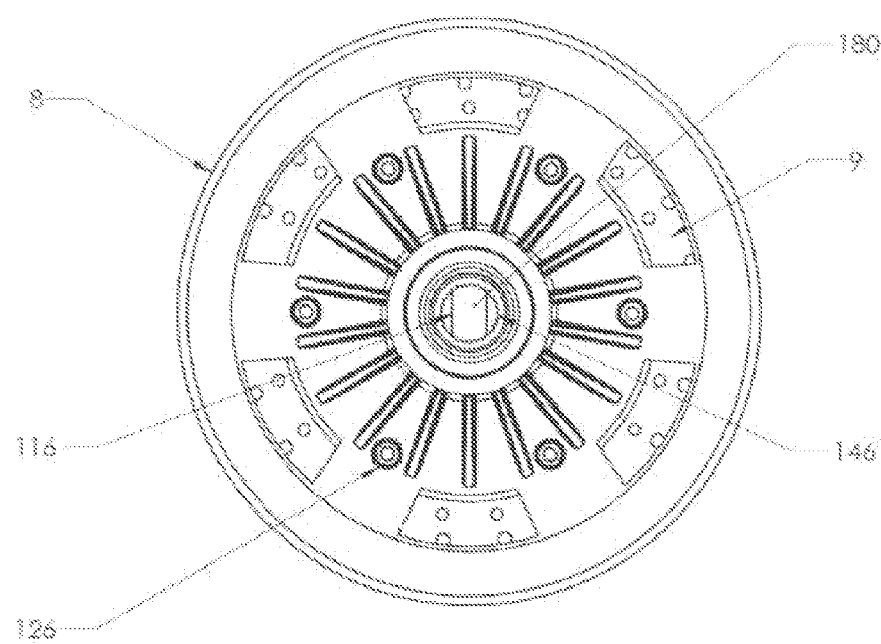
FIG. 22 is an end view of a drive assembly of the embodiment of FIG. 18 showing a drive sprocket suitable for use in the present invention as attached to the differential assembly and disc brake of the present invention.

Referring to FIG. 22, this is an end view of the drive assembly 114 of the embodiment of FIG. 18 showing a drive sprocket 8 suitable for use in the present invention as attached to the differential assembly 100 and disc brake 9 of the present invention. The interior teeth 146 of a spider gear 34 can be seen, these interior teeth 146 cooperating with exterior teeth 148 of an axle stub 19 such that the rotation of the spider gear 34 will turn axle stub 19.

Figure 23:
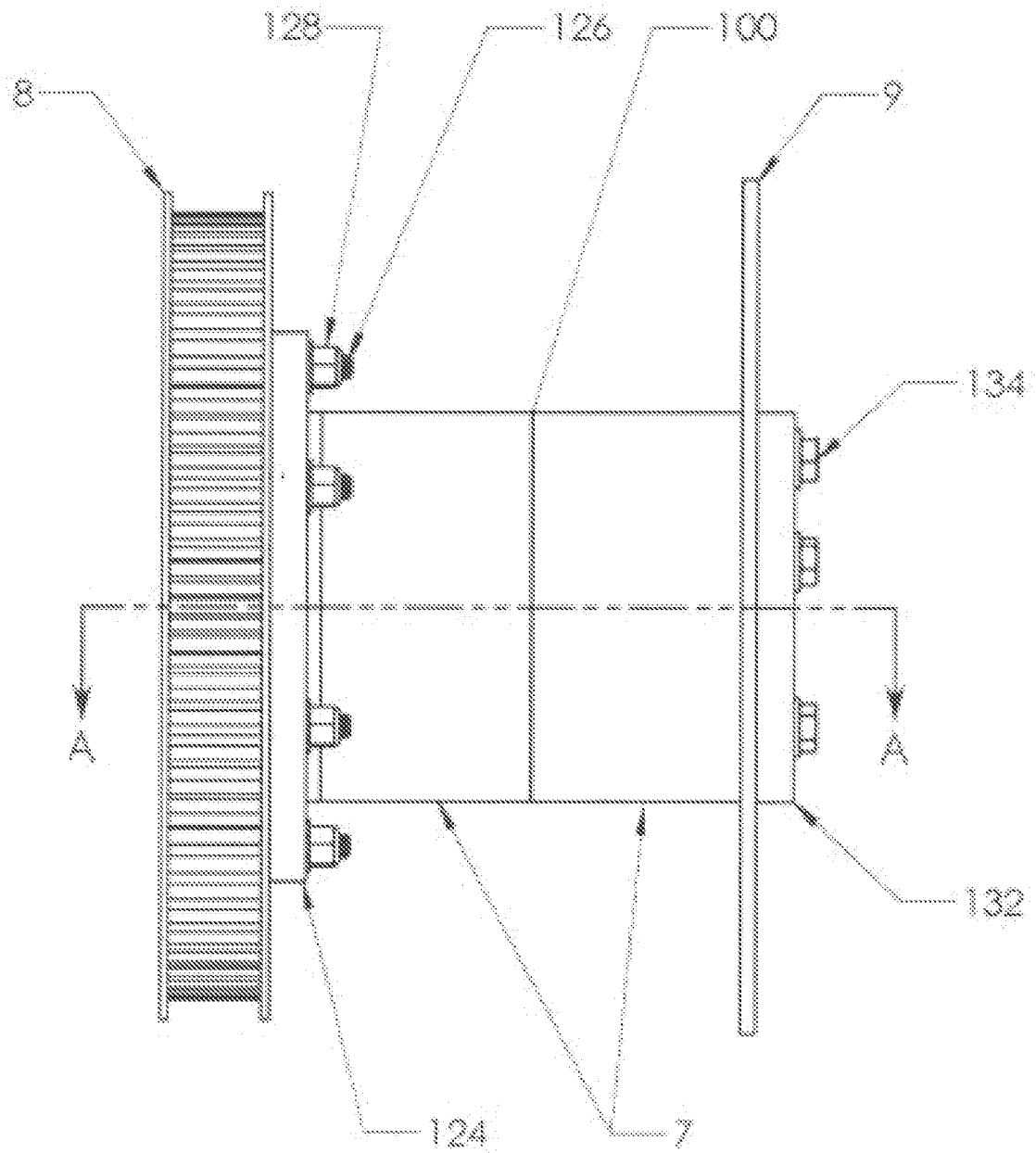
FIG. 23 is a rear view of the drive assembly of the embodiment of FIG. 18 showing a drive sprocket suitable for use in the present invention as attached to the differential assembly and disc brake of the present invention.

Referring to FIG. 23, this is a rear view of the drive assembly 114 of the embodiment of FIG. 18 showing a drive sprocket 8 suitable for use in the present invention as attached to the differential assembly 100 and disc brake 9 of the present invention. This view illustrates the assembled drive assembly 114. Although in the illustrative embodiments, the sprocket 8 is shown on a first side of the differential assembly 100, attached to a first differential half 7, and the disc brake 9 is shown on a second side of the differential assembly 100, attached to a second differential half 7, the sprocket 8 and the disc brake can be reversed or attached to the same side of the differential assembly 100. For example, the sprocket 8 can be attached to a second side of the differential assembly 100, that is, to a second differential half 7, and the disc brake 9 can be attached to a first side of the differential assembly 100, that is, to a first differential half 7. For another example, both the sprocket 8 and the disc brake 9 can be attached to a first side of the differential assembly 100, that is to a first differential half 7, or both the sprocket 8 and the disc brake 9 can be attached to a second side of the differential assembly 100, that is, to a second differential half 7. The mounting plate 124 and the pressure plate 132 can be used, deleted, or structured to accommodate such a set-up.

Figure 24:
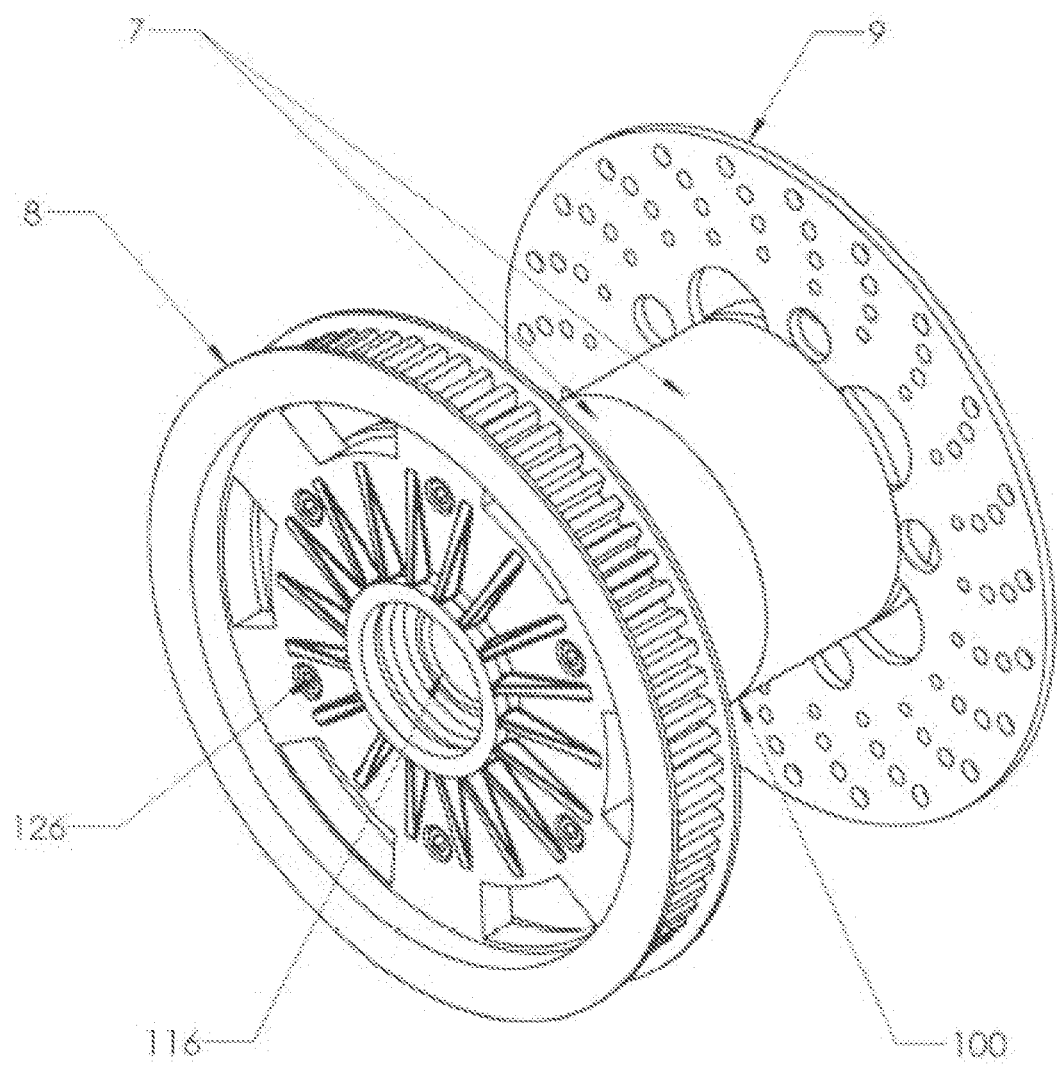
FIG. 24 is a perspective view of the embodiments of FIGS. 22 and 23.

Referring to FIG. 24, this is a perspective view of the embodiments of FIGS. 22 and 23 showing a drive sprocket 8 and disc brake 9 suitable for use in the present invention as attached to the differential assembly 100 of the present invention. This view also illustrates the assembled drive assembly 114.

Figure 25:
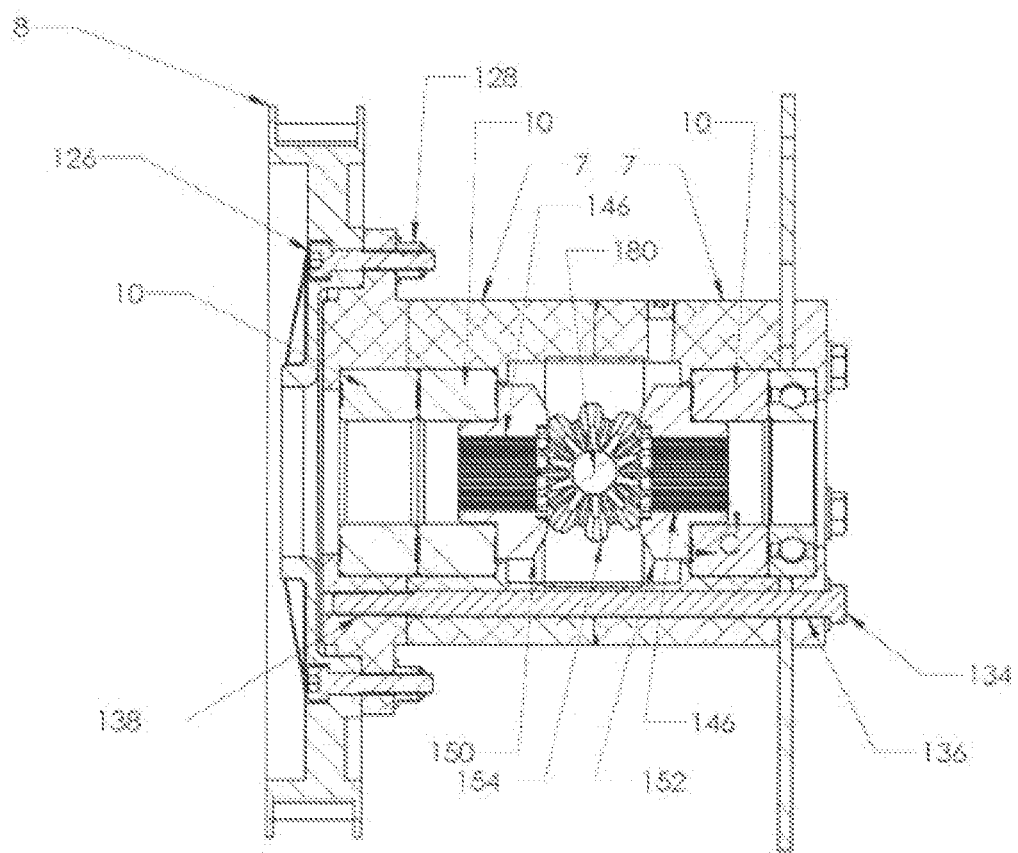
FIG. 25 is a sectional view along line A-A of FIG. 22

Referring to FIG. 25, this is a sectional view along line A-A of FIG. 22 showing the interior of the differential assembly 100. As can be seen, differential comprises first sun gear 150, second sun gear 152, and first planetary gear 154 structured and oriented in a generally conventional manner. This view also shows in more detail how sprocket 8, disc brake 9, and differential halves 7 form the drive assembly 114 as a single unit. In this view, the relative spacing of bearing 10 to sun gear 152 is shown such that sun gear 152 can rotate within differential housing 100 in a low friction manner. That is, this bearing 10 is a low-friction bearing that allows the rotation of planetary gear 152.

Figure 26:
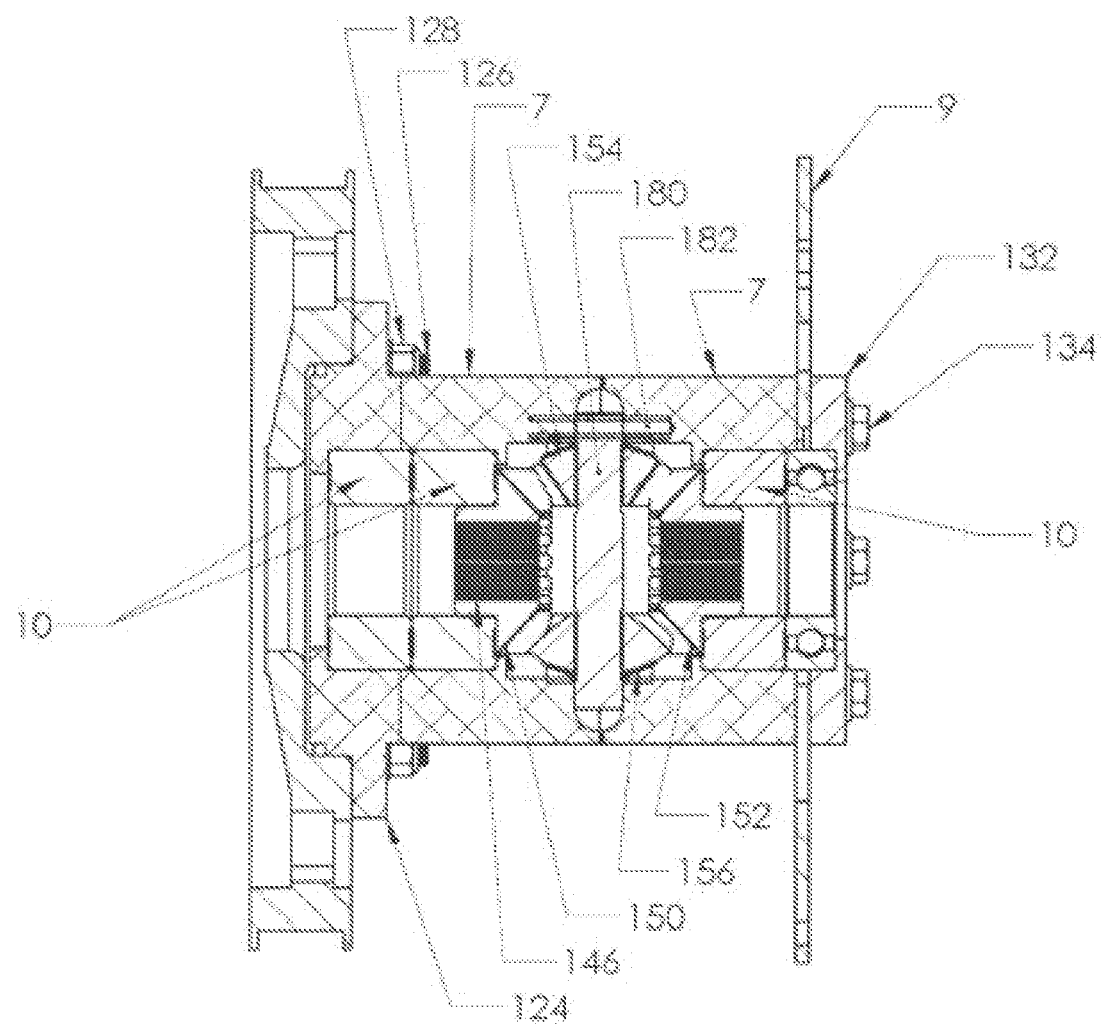
FIG. 26 is a sectional view along line B-B of FIG. 23.

Referring to FIG. 26, this is a sectional view along line A-A of FIG. 23 also showing the interior of the differential assembly 100. As can be seen in this view as well, differential comprises first sun gear 150, second sun gear 152, and first planetary gear 154, and also a second planetary gear 156, structured and oriented in a generally conventional manner. This view also shows in more detail how sprocket 8, disc brake 9, and differential halves 7 form the drive assembly 114 as a single unit. Shaft 180 supports planetary gears 154, 156 within the differential assembly 100 such that planetary gears can rotate about shaft 180. Shaft is secured within the differential assembly 100 via pin 182 such that when differential assembly 100 spins, shaft 180 also spins, thereby causing planetary gears 154, 156 to spin along with differential assembly 100, thus turning sun gears 150, 152 and powering axles 13 and wheels to move the trike. As the trike turns, the rear wheel on the inside of the turn will need to rotate more slowly than the rear wheel on the outside of the turn, and planetary gears 154, 156 can rotate about shaft 180 in a more or less conventional manner for the operation of a differential.

Figure 27:
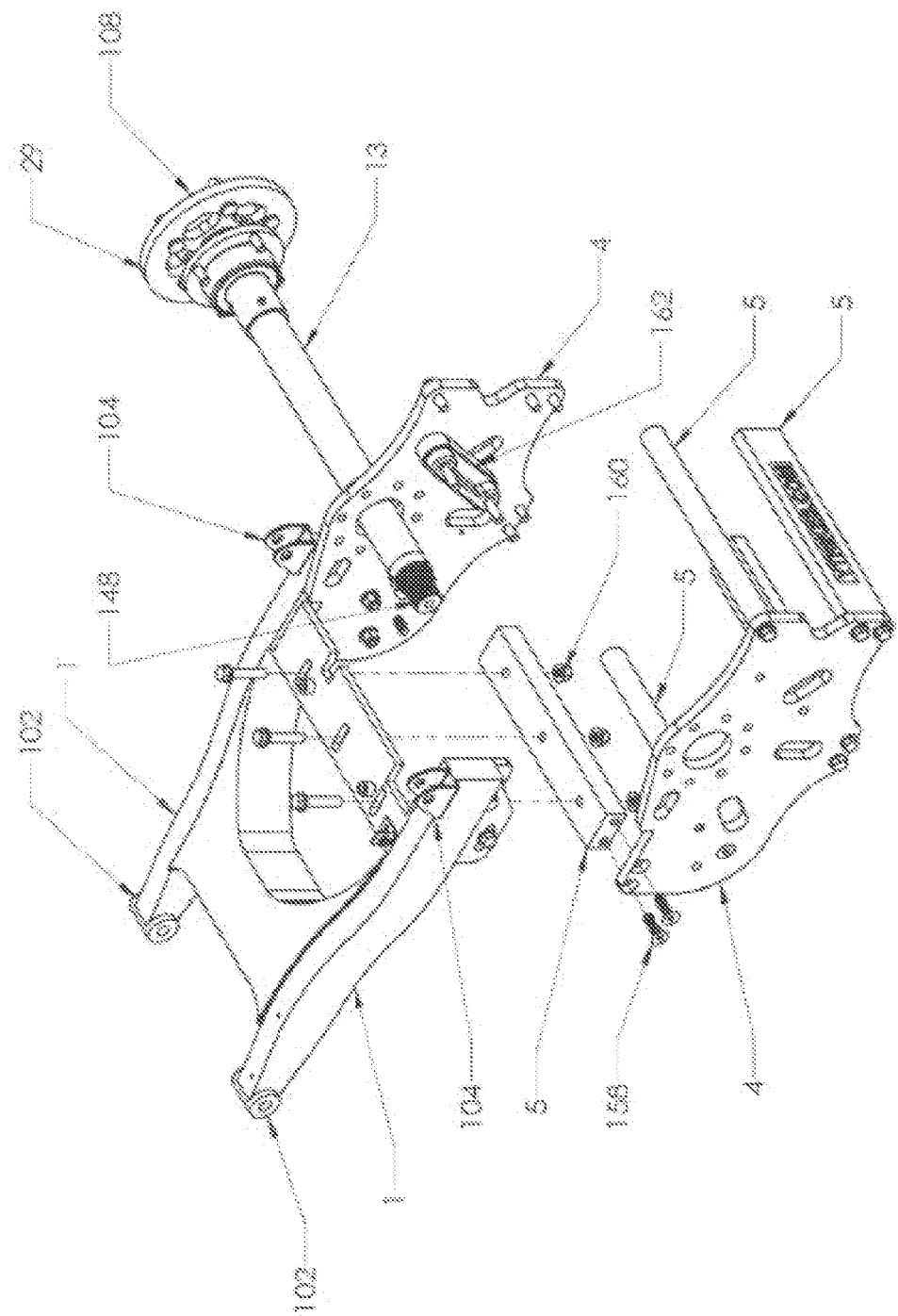
FIG. 27 is an exploded schematic view of the support framework of the embodiment of FIG. 18.

Referring to FIG. 27, this is an exploded schematic view of the support framework of the embodiment of FIG. 18, namely, of the box or frame 110. This view illustrates a manner in which side plates 4 and cross bars 5 can be assemble together using bolts 158 and nuts 160. Other manners of assembly can be used, such as welding; however, bolts 158 and nuts 160 are preferred for ease of assembling and disassembling the inventive device. This view also shows in greater detail how axle 13 and axle stub 19 extend through access hole 106 into the interior of box or frame 110. Axle support tube 11 is not shown. Caliper brake mounting bracket 162 can be included and onto which caliper brake 35 can be secured.

Figure 28:
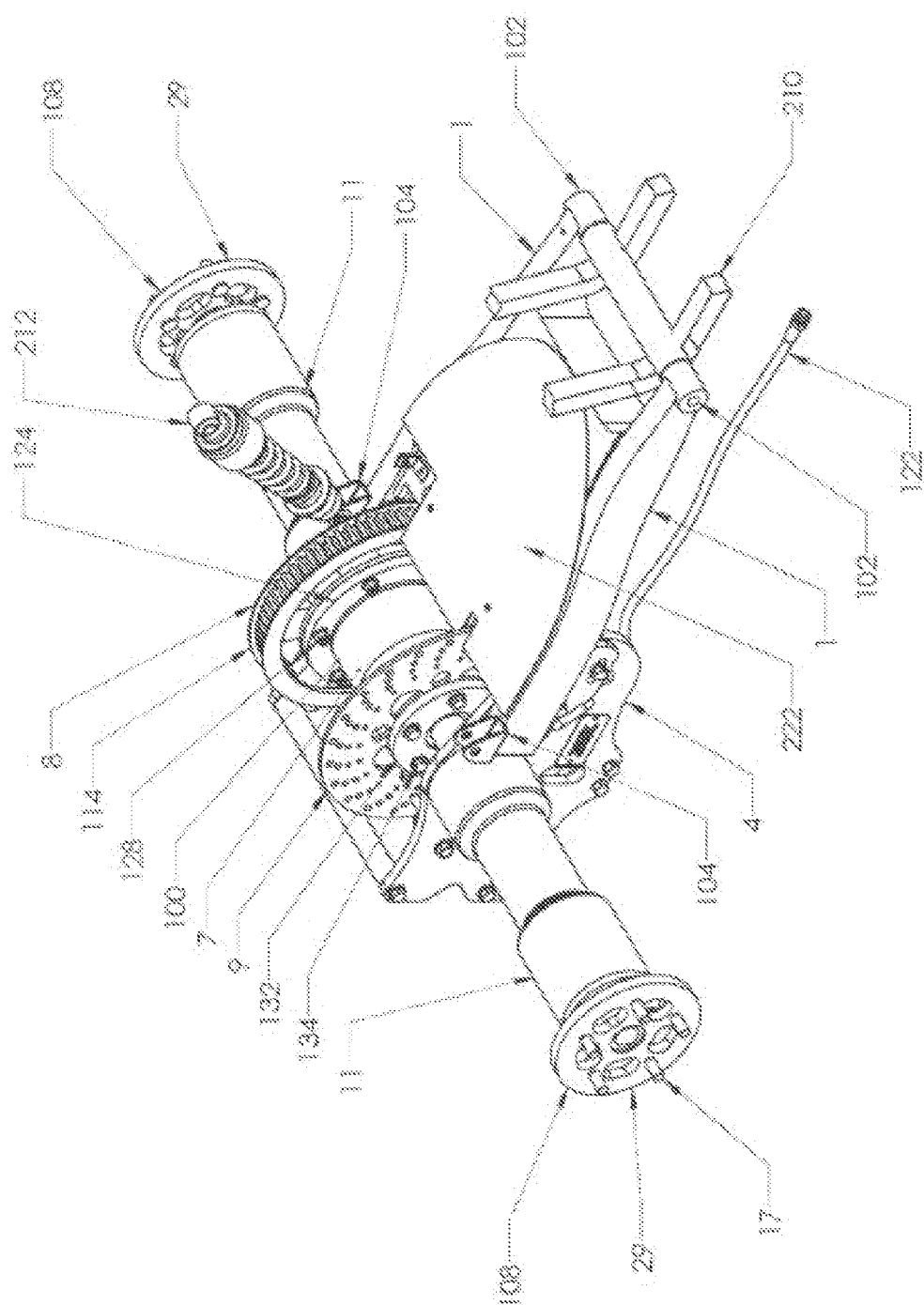
FIG. 28 is a front perspective schematic view of the embodiment of FIG. 18.

Referring to FIG. 28, this is a front perspective schematic view of the embodiment of FIG. 18. This view illustrates the invention as shown from the brake assembly side and also shows in more detail the attachment points 102 for pivotally attaching the swing arms 1 to the motorcycle frame and the anchors 104 for attaching the shock absorbers to the swing arms 1. In one embodiment, swing arms 1 via attachment points 102 are attached to a motorcycle frame 210, shown schematically in ghost lines. Shock absorbers, such as the representative shock absorber 212 shown schematically in ghost lines, are attached to anchors 104 and to the motorcycle frame 210 at common attachment points, such as proximal to the motorcycle seat. Adjusting holes 3 in overlay plate 2 also are shown in more detail, and provide space for sprocket 8 and disc brake 9 to rotate without contacting safety plate 2.

Figure 29:
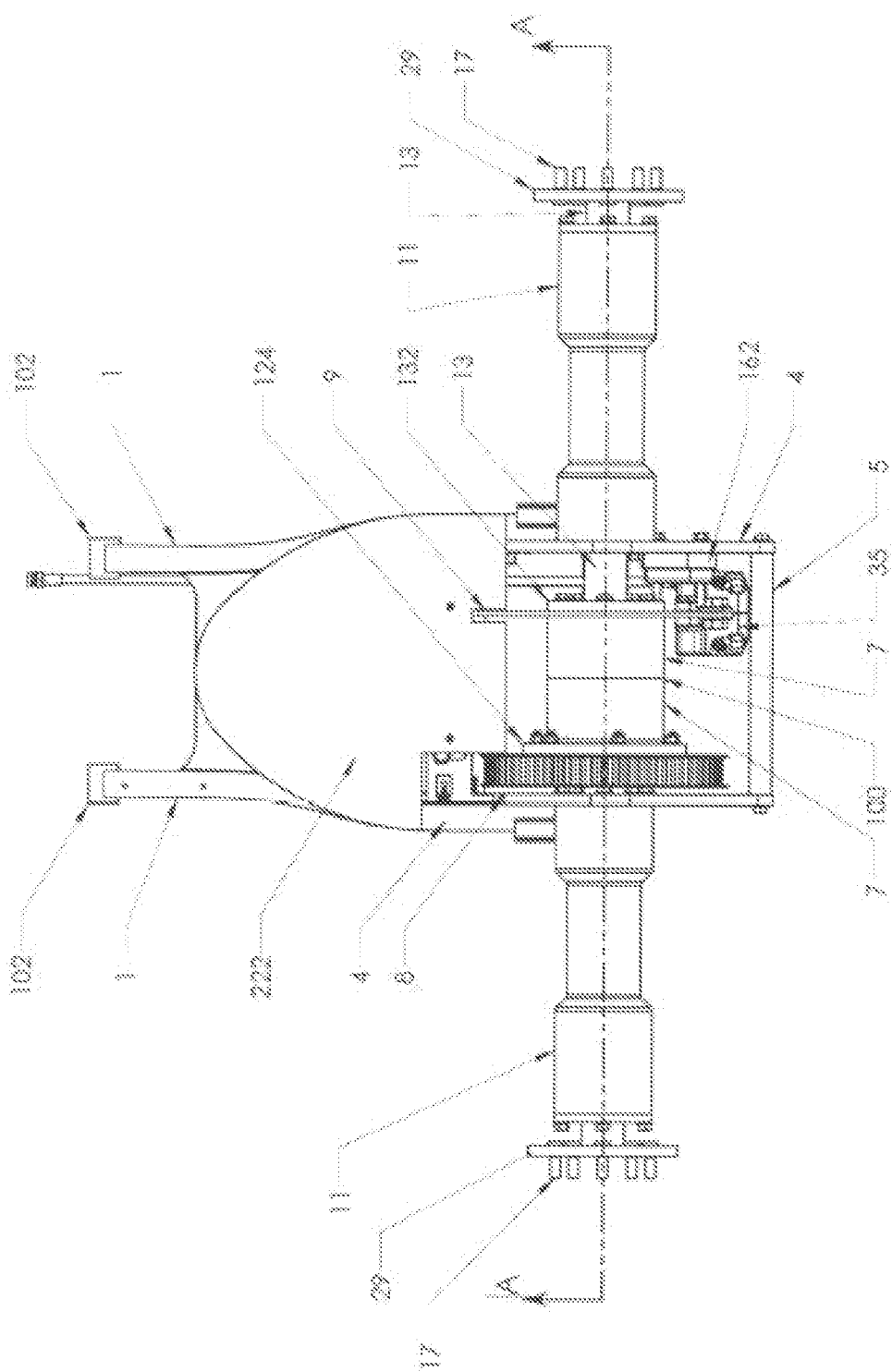
FIG. 29 is a top schematic view of the embodiment of FIG. 18.

Referring to FIG. 29, this is a top schematic view of the embodiment of FIG. 18 illustrating in greater detail the inventive device in an assembled form. In this view, it can be seen that first wheel hub 29, first axle 13, first axle support tube 11, sprocket 8, mounting plate 124, first differential half 7, second differential half, disc brake 9, pressure plate 132, second axle 13, second axle support tube 11, and second wheel hub 29 are all coaxial with one another as mounted on side plates 4 of box or frame 110. In this view, the drive assembly 114 is located to the left side of the interior of the box or frame 110. By using a first axle 13 on the left side of the drive assembly 114 that is longer, and a second axle 13 on the right side of the drive assembly 114 that is shorter, the drive assembly 114 can be located more centrally in, or to the right side of, the interior of the box or frame 110. Thus, the position of the drive assembly 114 can be matched to a specific original motorcycle depending on where the drive chain or drive belt of the original motorcycle is located relative to the box or frame 110.

Figure 30:
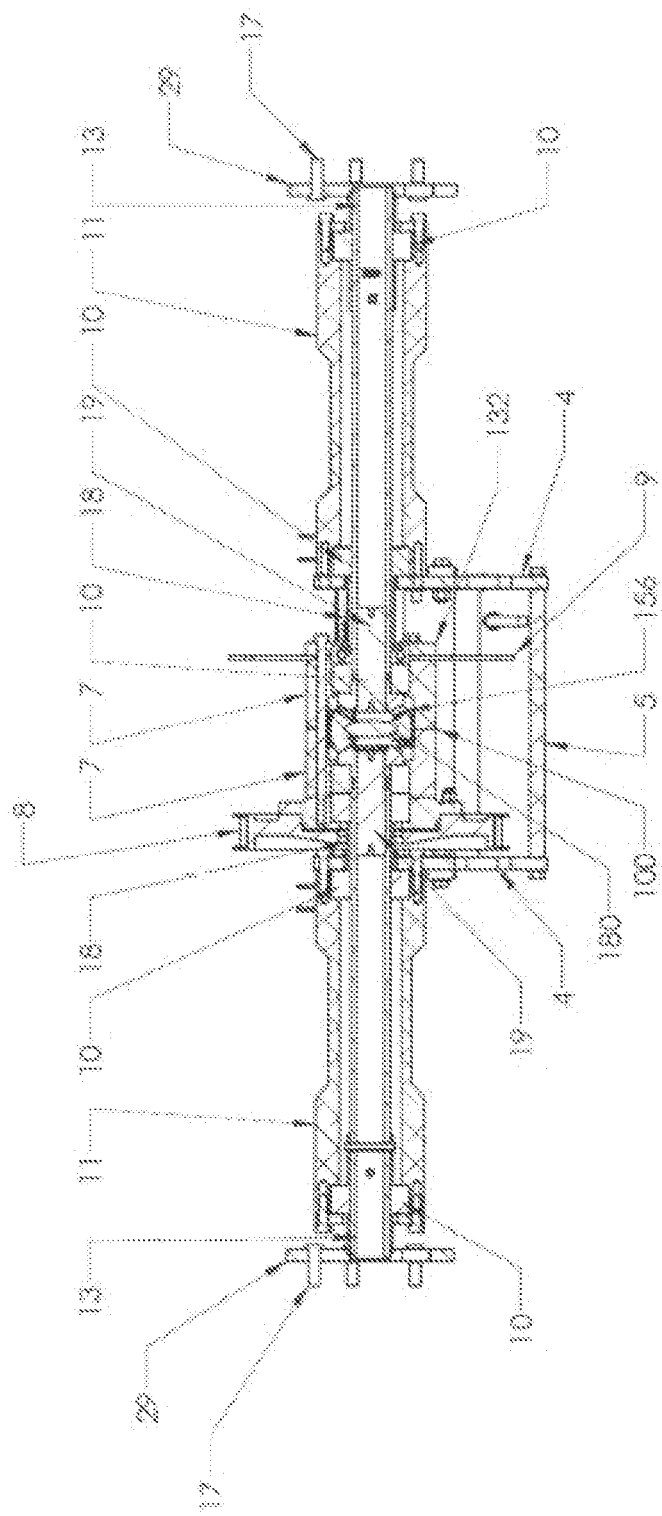
FIG. 30 is a sectional view along line A-A of FIG. 29.

Referring to FIG. 30, this is a sectional view along line A-A of FIG. 29 also illustrating in greater detail the inventive device in an assembled form. In this view, it can be seen in greater detail that first wheel hub 29, first axle 13, first axle support tube 11, sprocket 8, mounting plate 124, first differential half 7, second differential half, disc brake 9, pressure plate 132, second axle 13, second axle support tube 11, and second wheel hub 29 are all coaxial with one another as mounted on side plates 4 of box or frame 110. In this view, it also can be seen in greater detail how axle stubs 19 connect hollow axles 13 to spider gears 34. This both allows spider gears 34 to drive axles 13 and allows axles 13 to support the drive assembly within the box or frame 110.

Figure 31:
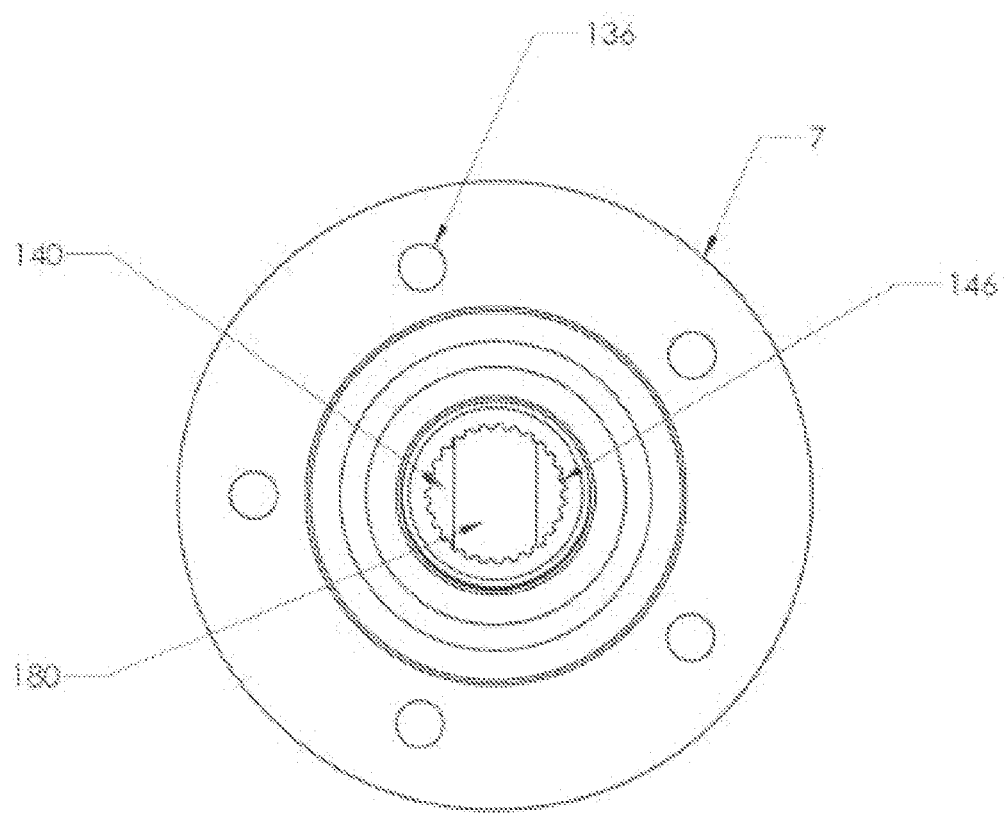
FIG. 31 is an end view of the differential housing of FIG. 18.

Referring to FIG. 31, this is an end view of the differential assembly 100 of FIG. 18, showing an end of a differential half 7. The interior teeth 146 of a spider gear 34 can be seen, these interior teeth 146 cooperating with exterior teeth 148 of an axle stub 19 such that the rotation of the spider gear 34 will turn axle stub 19.

Figure 32:
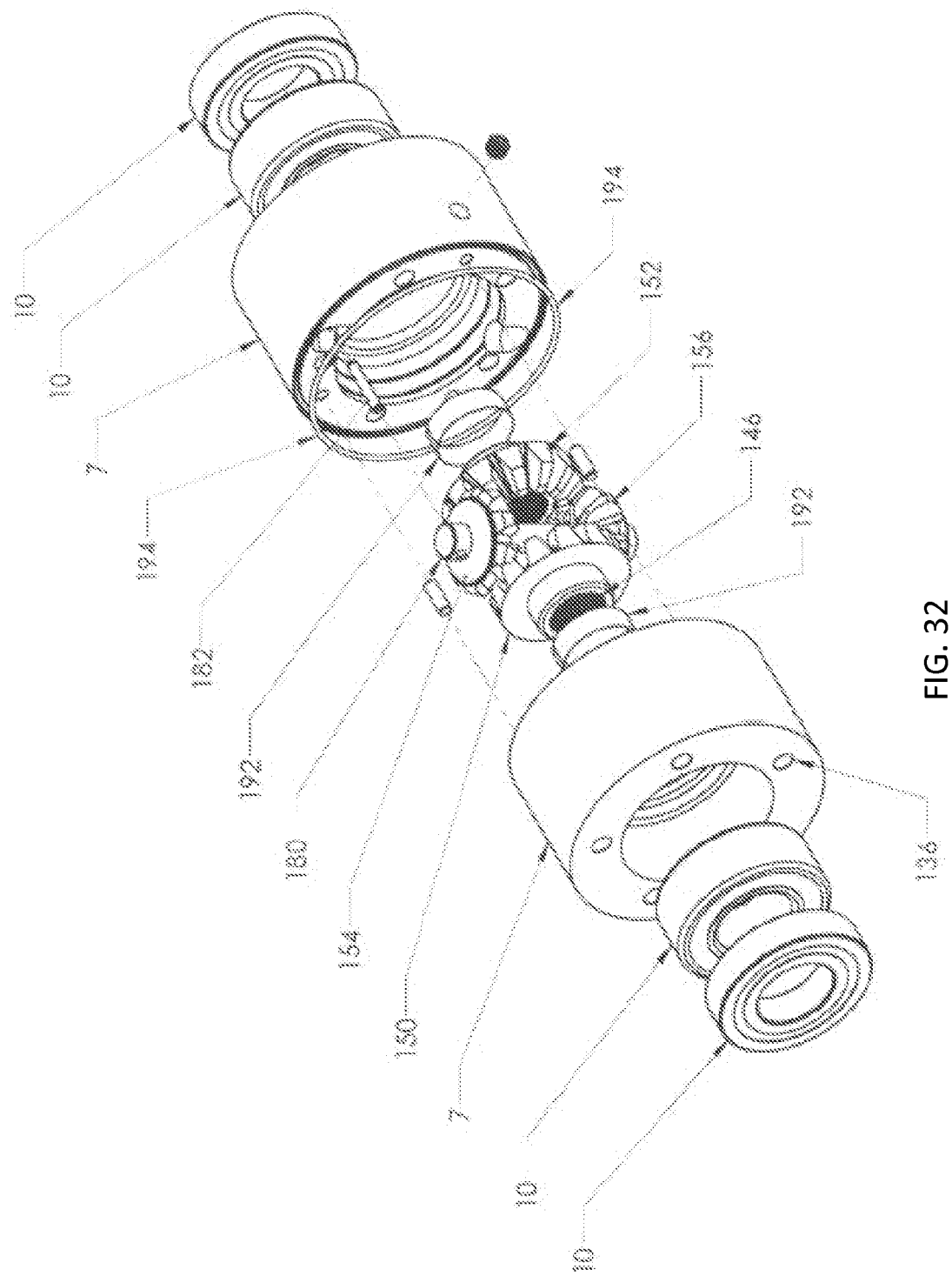
FIG. 32 is an exploded schematic perspective view of a differential and a differential housing of the present invention.

Referring to FIG. 32, this is an exploded schematic perspective view of a differential and a differential assembly 100 of the present invention. When the differential assembly 100 is assembled, sealers such as O-ring 194 can be used to prevent lubricant from leaking out of the interior of the differential assembly 100 and/or to better retain the respective components on or within the differential assembly. A shim 192, such as a steel shim, can be used to secure the spider gear 150, 152 to the bearing 10, if necessary or desired. For example, shim 192 can be located between bearing 10 and a central hole through bearing 150, 152 such that spider gear 150, 152 and bearing are mechanically fastened as a press fit, whereby spider gear 150, 152 can freely rotate within the differential assembly 100.

Figure 33:
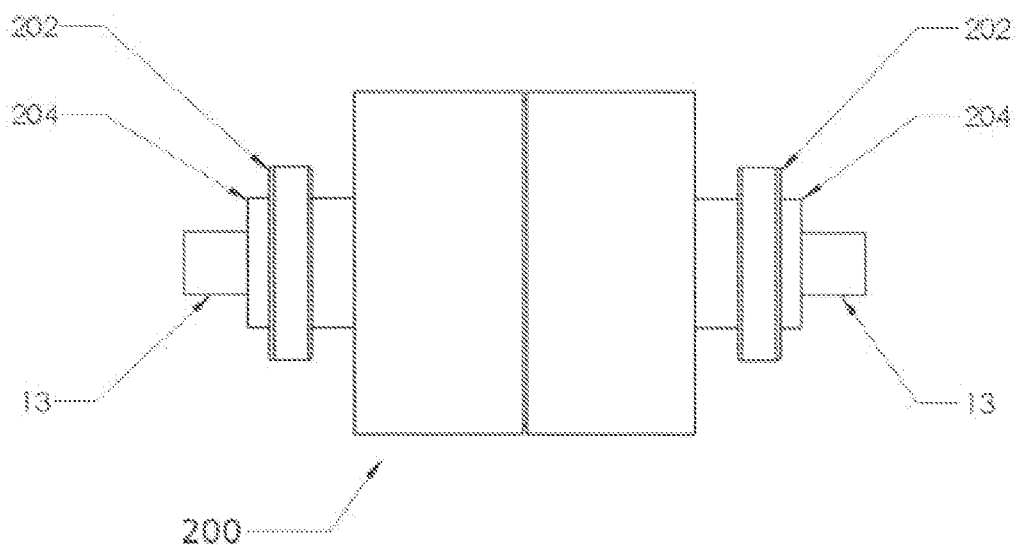
FIG. 33 is a schematic representation of a prior art straddle differential housing.

Referring to FIG. 33, this is a schematic representation of a straddle differential assembly 200 of the prior art. This prior art straddle differential assembly 200 illustrates a difference between the non-straddle differential assembly 100 of the present invention and the prior art. As disclosed herein, the non-straddle differential assembly 100 comprises a differential that is supported by the axles 13 via the axle stubs 19 connecting the axles 13 to the spider gears 34, by which the differential assembly 100, and the drive assembly 114, is supported by the axles. No other supports are needed or necessary to support the differential assembly 100 on the inventive device. The prior art differentials are not structured for such support, instead relying on external bearings 202 located on extension tubes 204 extending outwardly from the straddle differential assembly 200. The external bearings 202 are supported by being attached to the automotive frame. Thus, the prior art straddle differential assembly 200 rotates within the external bearings 200. On the contrary, the present non-straddle differential assembly 100 rotates while being supported by the axles 13 and does not need external bearings 202 or external bearing 202 support.

Thus, it can be seen that the present inventive device can be used as a replacement for a conventional rear wheel assembly of a motorcycle for converting the motorcycle into a tricycle with little to no addition modifications of the motorcycle frame 210 or main structural aspects of the original motorcycle. For example, the box frame 110, 420 can comprise at least two side plates 4, 424 and at least one supporting cross bar 5, 426 connecting the at least two side plates 4, 424 together, whereby the differential assembly 110 is located between the at least two side plates 4, 424, whereby the box or frame 110, 420 is placed between an opening left when a stock rear tire of the two-wheeled motorcycle is removed and replaced with the kit. The kit also can comprise a drive sprocket 8, 452 attached to the differential assembly 100, whereby the differential assembly 100 including the drive sprocket 8, 452 is located between the at least two side plates 4, 424, whereby the box or frame 110, 420 is placed between an opening left when a stock rear tire of the two-wheeled motorcycle is removed and replaced with the kit. The kit can further comprise a brake 9 attached to the differential assembly 100, whereby the differential assembly 100 including the drive sprocket 8, 452 and the brake 9 is located between the at least two side plates 4, 424, whereby the box or frame 110, 420 is placed between an opening left when a stock rear tire of the two-wheeled motorcycle is removed and replaced with the kit.

After the rear wheel assembly of the original motorcycle, which comprises the rear wheel, the rear brake assembly, the drive assembly, and the swing arms, is removed from the original motorcycle, the inventive device can be attached to the original motorcycle via the original attachment points for the original swing arms and to the original shock absorbers and/or suspension, thus converting the original motorcycle to a tricycle. Original hydraulic and electric lines can be attached to the inventive device as needed to operate, for example, the rear brake.

Thus, the invention also includes a method for converting a two-wheeled motorcycle into a three-wheeled motorcycle, comprising:

providing a conversion kit comprising a differential assembly comprising a non-straddle differential, a frame, and an axle assembly comprising an axle, wherein the non-straddle differential is supported by the axle, and wherein the frame comprises at least two side plates and at least one supporting cross bar connecting the at least two side plates together, as disclosed hereinabove;

removing the rear wheel assembly of the two-wheeled motorcycle; and attaching the conversion kit to the two-wheeled motorcycle, whereby the differential assembly is located between the at least two side plates, whereby the frame is placed between an opening left when the rear wheel assembly of the two-wheeled motorcycle is removed and replaced with the kit, as disclosed hereinabove.

The invention also includes a method of converting a motorcycle axle such that the pre-existing drive assembly of an original wheel powers the differential assembly of a two-wheeled replacement system, the method comprising the actions of:

disengaging the original wheel from the pre-existing drive assembly, such that a void is left;

engaging a drive assembly adaptor, comprising a first drive sprocket defining a first plane of rotation, to the pre-existing drive assembly, such that the first drive sprocket rotates via rotation of the pre-existing drive assembly;

engaging a frame, comprising at least two side plates and at least one supporting cross bar connecting the at least two side plates, about the pre-existing drive assembly, such that the frame is positioned within the void, the frame defines an internal space, and the drive assembly adaptor is positioned within the internal space; and positioning a differential assembly, comprising a second drive sprocket defining a second plane of rotation, within the internal space of the frame, such that the differential assembly is set back from the drive assembly adaptor and the pre-existing drive assembly, the first drive sprocket is aligned with the second drive sprocket, the second plane of rotation is coplanar with the first plane of rotation, and the second drive sprocket rotates via rotation of the first drive sprocket.

The foregoing description of the preferred embodiments and the appended figures have been presented only for illustrative and descriptive purposes and are not intended to be exhaustive or to limit the scope and spirit of the invention. The embodiments were selected and described to best explain the principles of the invention and its practical applications. One of ordinary skill in the art will recognize that many variations can be made to the invention disclosed in this specification without departing from the scope and spirit of the invention.

LIST OF REFERENCE NUMERALS 1 swing arm
2 overlay plate
3 adjusting holes
4 side plates
5 stiffening rods
6 front mounted inner supports
7 differential half or halves
8 sprocket or pulley
9 brake
10 bearing
11 axle support tubes
13 axle
17 wheel studs
18 spacers
19 axle stubs
29 wheel hubs
30 end cap
31 tapered shaft
32 mounting block
33 lock axle nut
34 spider gears
35 fixed caliper
100 differential assembly
102 attachment points
104 anchors
106 access holes
108 wheel hub assemblies
110 box or frame
112 axle assembly
114 drive assembly
116 sprocket hole
118 disc brake hole
122 hydraulic line
124 mounting plate
126 bolt
128 nut
130 access hole
132 pressure plate
134 bolt
136 hole or tunnel
138 threaded hole
140 access hole
142 access hole
144 access hole
146 interior teeth
148 exterior teeth
150 first sun gear
152 second sun gear
154 first planetary gear
156 second planetary gear
158 bolt
160 nut
162 mounting bracket
164 bolt hole
166 receiving hole
170 bolt
180 shaft
182 pin
192 shim
194 o-ring
200 straddle differential assembly
202 external bearing
204 extension tube
210 motorcycle frame
212 shock absorber
222 safety plate
300 motorcycle
302 rear wheel
304 transfer case
306 swing arm
307 exhaust
308 original axle
310 original attachment means
312 original axle bolt head
314 original axle nut bolt/cotter pin
316 hollow spacers
318 hollow collar
320 shock absorber
322 splined hub
324 void
400 conversion kit
410 transfer case adaptor
412 sprocket
414 first secondary add-on
420 box frame
422 transfer case side plate
424 swing arm side plate
426 cross bars/stiffening rods 428 shock absorber attachment assemblies
430 means for attaching
440 means for spacing
442 recess/aperture
444 recess/aperture
450 drive and brake assembly
452 sprocket
460 first axle assembly
470 second axle assembly
480 chain
490 chain wheel

What is claimed is:

1. An axle conversion kit for a motorcycle having a pre-existing rear drive assembly and a corresponding original wheel, the conversion kit replacing the original wheel with an off-set differential assembly for a two-wheeled replacement system that draws transmission power from a pre-existing transfer case of the pre-existing rear drive assembly, the conversion kit comprising:
   a transfer case adaptor configured to mechanically engage with the pre-existing transfer case and a pre-existing swing arm of the pre-existing rear drive assembly, and to rotate via mechanical rotation transmitted through the pre-existing transfer case;
   a first drive sprocket mechanically engaged to the transfer case adaptor such that mechanical rotation of the transfer case adaptor translates to mechanical rotation of the first drive sprocket;
   an axle-supported differential assembly;
   a second drive sprocket mechanically engaged to the axle-supported differential assembly, the second drive sprocket configured to mechanically link with the first drive sprocket such that mechanical rotation from the pre-existing transfer case translates to mechanical rotation in the second drive sprocket and mechanical rotation in the axle-supported differential assembly; and
   a frame configured to securely engage with the pre-existing transfer case and defining an internal space;
   wherein, when the conversion kit is assembled and installed on a motorcycle:
      the frame is positioned, and pivotally suspended, within a void left by the original wheel of the motorcycle;
      the pre-existing transfer case, the pre-existing swing arm, the transfer case adaptor, the first drive sprocket, the axle-supported differential assembly, and the second drive sprocket are positioned within the internal space of the frame; and
      the axle-supported differential assembly is rearwardly set back from the transfer case adaptor, the pre-existing transfer case, and the pre-existing swing arm;
      with the proviso that, when the conversion kit is assembled and installed on the motorcycle, the axle-supported differential assembly is not mounted to the pre-existing transfer case or to the pre-existing swing arm.

2. The conversion kit of claim 1, further comprising a chain or belt configured to mechanically link the first drive sprocket with the second drive sprocket.

3. The conversion kit of claim 1, further comprising:
   a two-wheeled replacement system for the original wheel, the two-wheeled replacement system comprising a first axle assembly and a second axle assembly, the first axle assembly and the second axle assembly configured to extend through, and to rigidly engage with, the frame;
   wherein, when the conversion kit is assembled and installed on the motorcycle,
      the first axle assembly, the second axle assembly, and the axle-supported differential assembly are coaxial; and
      the axle-supported differential assembly is supported by the first axle assembly and the second axle assembly.

4. The conversion kit of claim 1, wherein the frame is further configured to securely receive a pre-existing brake assembly of the original wheel, wherein, when the conversion kit is assembled and installed on the motorcycle:
   the pre-existing brake assembly is positioned within the internal space of the frame; and
   the pre-existing brake assembly operates on the differential assembly.

5. The conversion kit of claim 1, wherein:
   the pre-existing rear drive assembly also comprises an original axle about which the transfer case adaptor and the first drive sprocket are mounted; and
   the transfer case adaptor comprises a secondary add-on configured to rotatably anchor the original axle to the frame,
   wherein, when the conversion kit is assembled and installed on the motorcycle, the original axle is positioned within the internal space of the box frame, and extends between the pre-existing transfer case and the pre-existing swing arm of the pre-existing rear drive assembly, the transfer case adaptor is mounted about the original axle, and the original axle is rotatably engaged with the frame via the secondary add-on.

6. The conversion kit of claim 1, wherein:
   the frame is additionally configured to engage with a shock absorber of the motorcycle, the shock absorber corresponding to the pre-existing drive assembly; and
   when the conversion kit is assembled and installed on the motorcycle:
      the axle conversion kit is primarily supported by the pre-existing transfer case and the pre-existing swing arm; and
      the axle conversion kit is pivotally suspended in the void left by the original wheel.

7. A one-wheel to two-wheel axle conversion kit for a motorcycle having a pre-existing rear drive assembly and a corresponding original wheel, the conversion kit replacing the original wheel with an off-set, non-straddle, axle-supported differential assembly that draws transmission power from a pre-existing transfer case of the pre-existing rear drive assembly, the conversion kit requiring no significant modification to the pre-existing rear drive assembly, the conversion kit comprising:
   a transfer case adaptor configured to mechanically engage with a pre-existing transfer case and a pre-existing swing arm of the pre-existing rear drive assembly such that mechanical rotation from the pre-existing transfer case translates to the transfer case adaptor, the transfer case adaptor comprising an exposed first drive sprocket defining a first plane of rotation, the first drive sprocket configured to rotate as the transfer case adaptor rotates;
   a differential assembly comprising a second drive sprocket defining a second plane of rotation, the second drive sprocket configured to mechanically engage with the first drive sprocket such that mechanical rotation from the pre-existing transfer case translates to the differential assembly; and a box frame configured to securely engage with the pre-existing transfer case, the frame defining an internal space;

wherein, when the conversion kit is assembled and installed on the motorcycle:

the box frame is positioned within a void left by the original wheel of the motorcycle;

the pre-existing transfer case, the pre-existing swing arm, the transfer case adaptor, and the differential assembly are positioned within the internal space of the frame;

the differential assembly is rearwardly set back from the transfer case adaptor, the pre-existing transfer case, and the pre-existing swing arm; and the first drive sprocket is aligned with the second drive sprocket such that the second plane of rotation is coplanar with the first plane of rotation;

with the proviso that, when the conversion kit is assembled and installed on the motorcycle, the differential assembly is not mounted to the pre-existing transfer case or to the pre-existing swing arm.

8. The conversion kit of claim 7, further comprising a chain or belt configured to mechanically link the first drive sprocket and the second drive sprocket.

9. The conversion kit of claim 7, further comprising:

a two-wheeled replacement system for the original wheel, the two-wheeled replacement system comprising a first axle assembly and a second axle assembly, the first axle assembly and the second axle assembly configured to extend through, and to rigidly engage with, the box frame;

wherein, when the conversion kit is assembled and installed on the motorcycle, the first axle assembly, the second axle assembly and the differential assembly are coaxial; and the differential assembly is supported by the first axle assembly and the second axle assembly.

10. The conversion kit of claim 7 wherein the box frame is further configured to securely receive a pre-existing brake assembly of the original wheel, wherein, when the conversion kit is assembled and installed on the motorcycle:

the pre-existing brake assembly is positioned within the internal space of the box frame; and the pre-existing brake operates on the differential assembly.

11. The conversion kit of claim 7, wherein a diameter of first drive sprocket of the transfer case adaptor is smaller than a diameter of the original wheel.

12. The conversion kit of claim 7, wherein:

the pre-existing rear drive assembly also comprises an original axle about which transfer case adaptor or the original wheel are mounted; and the transfer case adaptor comprises a secondary add-on configured to rotatably anchor the original axle to the box frame;

wherein, when the conversion kit is assembled and installed on the motorcycle, the original axle is positioned within the internal space of the box frame and extends between the pre-existing transfer case and the pre-existing swing arm of the pre-existing rear drive assembly, the transfer case adaptor is mounted about the original axle, and the original axle is rotatably engaged with the box frame via the secondary add-on.

13. The conversion kit of claim 7:

wherein the box frame is additionally configured to engage with a shock absorber of the motorcycle, the shock absorber corresponding to the pre-existing rear drive assembly; and wherein, when the conversion kit is assembled and installed on the motorcycle:

the axle conversion kit is primarily supported by the pre-existing transfer case and the pre-existing swing arm; and the axle conversion kit is pivotally suspended in the void left by the original wheel.

14. A motorcycle with a one-wheel to two-wheel axle conversion kit, the conversion kit replacing an original wheel with an off-set differential assembly, the motorcycle comprising:

a) a pre-existing drive assembly comprising a pre-existing transfer case and a pre-existing swing arm corresponding to the original wheel, the original wheel having been removed from the motorcycle;

b) a void which contained the original wheel;

c) a shock absorber; and d) the one-wheel to two-wheel axle conversion kit configured to draw transmission power from the pre-existing transfer case, the one-wheel to two-wheel axle conversion kit comprising:

a transfer case adaptor mechanically engaged with the pre-existing transfer case and the pre-existing swing arm such that mechanical rotation from the pre-existing transfer case translates to the transfer case adaptor, the transfer case adaptor comprising an exposed first drive sprocket, the first drive sprocket configured to rotate as the transfer case adaptor rotates;

a box frame securely engaged with the pre-existing transfer case and the shock absorber such that the box frame is positioned, and pivotally suspended, within the void, the box frame defining an internal space;

an axle-supported differential assembly comprising a second drive sprocket, the differential assembly positioned within the internal space of the box frame, the second drive sprocket mechanically linked with the first drive sprocket such that mechanical rotation from the pre-existing transfer case translates to mechanical rotation in the second drive sprocket and mechanical rotation in the axle-supported differential assembly;

wherein the pre-existing transfer case, the pre-existing swing arm, and the transfer case adaptor are also positioned within the internal space of the box frame; and wherein the axle-supported differential assembly is rearwardly set back from the transfer case adaptor, the pre-existing transfer case, and the pre-existing swing arm;

with the proviso that the differential assembly is not mounted to the pre-existing transfer case or to the pre-existing swing arm.

15. The motorcycle of claim 14, wherein the axle conversion kit further comprises a chain or belt mechanically linking the first drive sprocket and the second drive sprocket.

* * * * *